US012652658B2

(12) United States Patent
Yuan et al.

(10) Patent No.: US 12,652,658 B2
(45) Date of Patent: Jun. 9, 2026

(54) TRANSMISSION TIMING DETERMINING METHOD AND APPARATUS

(71) Applicant: HUAWEI TECHNOLOGIES CO., LTD., Shenzhen (CN)

(72) Inventors: Shitong Yuan, Chengdu (CN); Fengwei Liu, Chengdu (CN); Xinghua Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 18/352,298

(22) Filed: Jul. 14, 2023

(65) Prior Publication Data

US 2023/0362902 A1     Nov. 9, 2023

Related U.S. Application Data

(63) Continuation of application No. PCT/CN2021/072267, filed on Jan. 15, 2021.

(51) Int. Cl.
H04W 72/0446     (2023.01)
H04L 27/26     (2006.01)
H04W 28/08     (2023.01)
H04W 72/1268     (2023.01)

(52) U.S. Cl.
CPC ... H04W 72/0446 (2013.01); H04L 27/26025 (2021.01); H04W 28/0858 (2020.05); H04W 72/1268 (2013.01)

(58) Field of Classification Search
CPC .............................................. H04W 72/0446
See application file for complete search history.

(56) References Cited

U.S. PATENT DOCUMENTS

| | | | |
|---|---|---|---|
| 2020/0404569 A1 | 12/2020 | Cho et al. | |
| 2022/0070810 A1* | 3/2022 | Bi ..................... | H04W 56/0015 |
| 2023/0247574 A1* | 8/2023 | Ghanbarinejad ... | H04W 56/001 |
| | | | 370/503 |

FOREIGN PATENT DOCUMENTS

| | | |
|---|---|---|
| CN | 110535677 A | 12/2019 |
| CN | 111901858 A | 11/2020 |
| EP | 3297343 A2 | 3/2018 |
| EP | 3896903 A1 | 10/2021 |

OTHER PUBLICATIONS

Extended European Search Report for Application No. 21918599.8 dated Feb. 15, 2024, 7 pages.

(Continued)

*Primary Examiner* — Pamit Kaur

(57) ABSTRACT

A transmission timing determining method and apparatus are provided, to determine a transmission timing of an IAB node. The method is applied to a first node, and a second node may be an upper-level node or a donor node of the first node. The method includes: The first node receives control information from the second node, where the control information includes scheduling information of uplink transmission, and the control information includes first scrambling information. The first node determines a first timing type associated with the first scrambling information. The first node determines a transmission timing of the uplink transmission based on the first timing type.

17 Claims, 7 Drawing Sheets

(56) References Cited

OTHER PUBLICATIONS

3GPP TSG RAN WG1 #103-e R1-2008995, 3GPP, Enhancements to Resource Multiplexing between Child and Parent Links of an IAB Node, Intel Corporation, Nov. 1, 2020, total 13 pages.

3GPP SG RAN WG1 #100_e R1-2000400, 3GPP, Remaining issues in IAB resource multiplexing, ZTE, Sanechips, Feb. 14, 2020, total 4 pages.

3GPP TSG-SA WG2 #78 S2-100972, 3GPP, LS on Enhancements to PS Handover procedures, Geran, Feb. 1, 2010, total 10 pages.

3GPP TSG RAN WG2 #111-e R2-2008634, 3GPP, Update to IAB-MT capabilities, Nokia, Nokia Shanghai Bell, Sep. 4, 2020, total 13 pages.

3GPP TSG RAN WG1 #102-e R1-2006377, 3GPP, Text proposal on PDCCH monitoring in IAB, LG Electronics, Aug. 8, 2020, total 4 pages.

3GPP TSG RAN WG1 #102-e R1-2006745, 3GPP, Other enhancements for simultaneous operation of IAB-node's child and parent links, NTT DOCOMO, Inc., Aug. 7, 2020, total 7 pages.

Notice of Reasons for Rejection for Application No. 2023-542725 dated Jul. 1, 2024, 7 pages.

3rd Generation Partnership Project; Technical Specification Group Radio Access Network; NR; Physical layer procedures for control (Release 16), 3GPP TS 38.213 V16.1.0 (Mar. 2020), Technical Specification, total 156 pages.

PCT International Search Report for Application No. PCT/CN2021/072267 dated Jan. 15, 2021, 118 pages.

* cited by examiner

Backhaul link
Access link

Donor node

IAB node 1

IAB node 2

Backhaul link

Access link

Donor node

IAB node 2

IAB node 1

| 0 | 1 | 2 | 3 | 4 | 5 | 6 | 7 | 8 | 9 |
|---|---|---|---|---|---|---|---|---|---|
| TDD period | | | | | TDD period | | | | |
| D | D | D | F | U | D | D | D | F | U |
| U | U | U | F | D | U | U | U | F | D |

First configuration

Second configuration

| 0 | 1 | 2 | 3 | 4 | 5 | 6 | 7 | 8 | 9 |
|---|---|---|---|---|---|---|---|---|---|
| | | TDD period | | | | | TDD period | | |

First configuration

| D | D | D | F | U | D | D | D | F | U |
|---|---|---|---|---|---|---|---|---|---|

Second configuration

| | U | U | | D | | U | U | | D |
|---|---|---|---|---|---|---|---|---|---|

TRANSMISSION TIMING DETERMINING METHOD AND APPARATUS

CROSS-REFERENCE TO RELATED APPLICATIONS

This application is a continuation of International Application No. PCT/CN2021/072267, filed on Jan. 15, 2021, the disclosure of which is hereby incorporated by reference in its entirety.

TECHNICAL FIELD

This application relates to the field of communication technologies, and in particular, to a transmission timing determining method and apparatus.

BACKGROUND

In a 5th generation (the fifth generation, 5G) mobile communication system new radio (NR) technology, a large bandwidth can be used, for example, a millimeter-wave band may be used. In addition, a large-scale antenna and a multi-beam system may be used. Therefore, a high system rate can be provided by 5G. This facilitates application of an integrated access and backhaul (IAB) node in 5G.

How to determine a transmission timing of the IAB node is a problem that needs to be considered.

SUMMARY

This application provides a transmission timing determining method and apparatus, to determine a transmission timing of an IAB node.

This application provides a transmission timing determining method and apparatus, to determine a transmission timing of an IAB node.

According to a first aspect, a transmission timing determining method is provided. The method is performed by a first node, and the first node may be an IAB node, a relay node, or any relay device. The method includes the following steps: The first node receives control information from a second node, where the control information includes scheduling information of uplink transmission, and the control signaling includes first scrambling information: the first node determines a first timing type associated with the first scrambling information; and the first node determines a transmission timing of the uplink transmission based on the first timing type. The first node may determine the first timing type based on the first scrambling information carried in the control information, and determine, based on the first timing type, the transmission timing of the uplink transmission scheduled by the control information. In this way, a timing type is implicitly indicated without adding a redundant field indicating the timing type in the control information.

In a possible design, the first node receives, from a donor node, an association relationship between scrambling information and a timing type. Optionally, the association relationship between the scrambling information and the timing type may be carried in an radio resource control (RRC) message. That the first node determines a first timing type associated with the first scrambling information includes: The first node determines, based on the association relationship, the first timing type associated with the first scrambling information. The donor node further needs to send the association relationship to a distributed unit (DU) of an upper-level node of the first node. For example, the donor node sends the association relationship to the DU of the upper-level node of the first node through F1-AP signaling. In this way, the DU of the upper-level node of the first node obtains the association relationship, and determines, based on the association relationship, a transmission timing of downlink transmission. Therefore, the transmission timing of the downlink transmission of the DU of the upper-level node of the first node corresponds to a transmission timing of uplink transmission of an mobile termination (MT) of the first node.

Alternatively, the association relationship may be predefined in a protocol.

In a possible design, the first timing type includes any one of the following: An uplink transmission timing is determined based on timing advance (TA) indication information from the second node: an uplink sending timing of a mobile termination (MT) of the first node is aligned with a downlink sending timing of a distributed unit (DU) of the first node: or an uplink receiving timing of the MT of the first node is aligned with a downlink receiving timing of the DU of the first node.

In a possible design, the uplink transmission is physical uplink shared channel (PUSCH) transmission; and the first node sends a physical uplink control channel (PUCCH) and/or an uplink sounding reference signal (SRS), where when the PUCCH and/or the SRS and a PUSCH are located in a same slot, a transmission timing of the PUCCH and/or the SRS is determined based on the first timing type. In other words, a transmission timing of the PUCCH and/or the SRS associated with the PUSCH follows a transmission timing of the PUSCH.

In a possible design, if no PUSCH transmission exists in a transmission slot of the PUCCH and/or the SRS, the transmission timing of the PUCCH and/or the SRS is determined based on a default timing type.

In a possible design, the control information is used to activate preconfigured granted PUSCH transmission.

According to a second aspect, a transmission timing determining method is provided. The method is performed by a first node, and the first node may be an IAB node, a relay node, or any relay device. The method includes the following steps: The first node receives configuration information from a second node, where the configuration information includes an association relationship between a time unit index and a timing type: the first node determines, based on the association relationship, a first timing type associated with a first time unit; and the first node determines, based on the first timing type, a transmission timing for performing uplink transmission in the first time unit. In this way, the first node may determine a timing type corresponding to a time unit occupied by current uplink transmission, to determine a transmission timing in the time unit by using the timing type. The timing type may be indicated in an implicit indication manner. In addition, signaling overheads are not increased.

In a possible design, the time unit index is an index determined at a reference subcarrier spacing; and that the first node determines, based on the association relationship, a first timing type associated with a first time unit includes: The first node determines the first timing type associated with the first time unit based on the reference subcarrier spacing, the subcarrier spacing corresponding to the first time unit, and the association relationship. In this way, the timing type can be determined when the terminal device operates at any subcarrier spacing.

In a possible design, that the first node determines the first timing type associated with the first time unit based on the reference subcarrier spacing, a subcarrier spacing corresponding to the first time unit, and the association relationship includes: The first node determines, based on the subcarrier spacing corresponding to the first time unit, a first time unit index that corresponds to the first time unit and that is at the reference subcarrier spacing; and the first node determines, based on the association relationship, the first timing type associated with the first time unit index.

In a possible design, the reference subcarrier spacing is a subcarrier spacing of a serving carrier of the first node: the reference subcarrier spacing is a subcarrier spacing of an active bandwidth part BWP of the first node: or the reference subcarrier spacing is a subcarrier spacing indicated by an instruction from the second node.

In a possible design, the first timing type includes any one of the following: An uplink transmission timing is determined based on timing advance (TA) indication information from the second node: an uplink sending timing of a mobile termination (MT) of the first node is aligned with a downlink sending timing of a distributed unit (DU) of the first node: or an uplink receiving timing of the MT of the first node is aligned with a downlink receiving timing of the DU of the first node.

In a possible design, the association relationship between the time unit index and the timing type is associated with an uplink transmission type, and the uplink transmission type includes one or more of a physical uplink shared channel (PUSCH), a physical uplink control channel PUCCH, or a sounding reference signal SRS.

According to a third aspect, a transmission timing determining method is provided. The method is performed by a first node, and the first node may be an IAB node, a relay node, or any relay device. The method includes the following steps: The first node receives control information from a second node, where the control information includes scheduling information of sounding reference signal SRS transmission, the control signaling includes first information, and the first information indicates an SRS transmission configuration: the first node determines a first timing type associated with the first information; and the first node determines a transmission timing of uplink transmission based on the first timing type. In this way, the control information that indicates the SRS transmission can be reused. This avoids complex protocol design and modification, and indicates a timing type.

In a possible design, the first information further indicates the first timing type.

In a possible design, an association relationship between the first information and the first timing type is specified in a protocol.

According to a fourth aspect, a transmission timing determining method is provided. The method is performed by a first node, and the first node may be an IAB node, a relay node, or any relay device. The first node determines a timing type based on the following rules, and further determines a transmission timing of uplink transmission. The rules include: A timing type 1 is used by default for periodic PUCCH and/or SRS transmission. A common terminal device served by an upper-level node of the first node also determines a transmission timing by using the timing type 1. This facilitates multiplexing of uplink of the IAB node and the common terminal device. The rules may further include: A timing type of the periodic PUCCH and/or SRS transmission is related to a time domain duplex (TDD) resource transmission direction. In a possible design, if time domain resources/a time domain resource occupied by a PUCCH and/or an SRS in a current period overlap/overlaps a UL slot in a second configuration, the first node uses a timing type 2 or a timing type 3.

If the time domain resources/the time domain resource occupied by the PUCCH and/or the SRS in the current period overlap/overlaps a UL slot in a first configuration, the first node uses the timing type 1.

If the UL slot in the first configuration and the UL slot in the second configuration overlap, and the time domain resources/the time domain resource occupied by the PUCCH and/or the SRS in the current period overlap/overlaps UL slots of the first configuration and the second configuration, the first node uses a default timing type. For example, the default timing type is the timing type 1.

The timing type 1 includes: An uplink transmission timing is determined based on timing advance TA indication information from a second node. The timing type 2 includes: An uplink sending timing of a mobile termination (MT) of the first node is aligned with a downlink sending timing of a distributed unit (DU) of the first node. The timing type 3 includes: An uplink receiving timing of the MT of the first node is aligned with a downlink receiving timing of the DU of the first node.

According to a fifth aspect, a communication apparatus is provided. The communication apparatus may be a first node, may be an apparatus located in the first node, or may be an apparatus that can be used with the first node. In a design, the communication apparatus may include modules that are in one-to-one correspondence with the methods/operations/steps/actions described in the first aspect. The modules may be hardware circuits, may be software, or may be implemented by using a combination of a hardware circuit and software. In a design, the apparatus may include a processing module and a communication module. The processing module is configured to invoke the communication module to perform a receiving and/or sending function. An example is as follows:

The communication module is configured to receive control information from a second node, where the control information includes scheduling information of uplink transmission, and the control signaling includes first scrambling information. The processing module is configured to: determine a first timing type associated with the first scrambling information, and determine a transmission timing of the uplink transmission based on the first timing type.

In a possible design, the communication module is further configured to receive, from a donor node, an association relationship between scrambling information and a timing type; and when determining the first timing type associated with the first scrambling information, the processing module is configured to determine, based on the association relationship, the first timing type associated with the first scrambling information.

In a possible design, the first timing type includes any one of the following: An uplink transmission timing is determined based on timing advance TA indication information from the second node: an uplink sending timing of a mobile termination MT of the first node is aligned with a downlink sending timing of a distributed unit (DU) of the first node: or an uplink receiving timing of the MT of the first node is aligned with a downlink receiving timing of the DU of the first node.

In a possible design, the uplink transmission is PUSCH transmission; and the communication module is further configured to send a physical uplink control channel (PUCCH) and/or an uplink sounding reference signal (SRS), where when the PUCCH and/or the SRS and a PUSCH are located in a same slot, a transmission timing of the PUCCH and/or the SRS is determined based on the first timing type.

In a possible design, the processing module is further configured to: if no PUSCH transmission exists in a transmission slot of the PUCCH and/or the SRS, determine the transmission timing of the PUCCH and/or the SRS based on a default timing type.

In a possible design, the control information is used to activate preconfigured granted PUSCH transmission.

According to a sixth aspect, a communication apparatus is provided. The communication apparatus may be a first node, may be an apparatus located in the first node, or may be an apparatus that can be used with the first node. In a design, the communication apparatus may include modules that are in one-to-one correspondence with the methods/operations/steps/actions described in the first aspect. The modules may be hardware circuits, may be software, or may be implemented by using a combination of a hardware circuit and software. In a design, the apparatus may include a processing module and a communication module. The processing module is configured to invoke the communication module to perform a receiving and/or sending function. For example, the communication module is configured to receive configuration information from a second node, where the configuration information includes an association relationship between a time unit index and a timing type; and the processing module is configured to: determine, based on the association relationship, a first timing type associated with a first time unit; and determine, based on the first timing type, a transmission timing for performing uplink transmission in the first time unit.

In a possible design, the time unit index is an index determined at a reference subcarrier spacing; and when determining, based on the association relationship, the first timing type associated with the first time unit, the processing module is specifically configured to determine the first timing type associated with the first time unit based on the reference subcarrier spacing, a subcarrier spacing corresponding to the first time unit, and the association relationship.

In a possible design, when determining the first timing type associated with the first time unit based on the reference subcarrier spacing, a subcarrier spacing corresponding to the first time unit, and the association relationship, the processing module is specifically configured to: determine, based on the subcarrier spacing corresponding to the first time unit, a first time unit index that corresponds to the first time unit and that is at the reference subcarrier spacing; and determine, based on the association relationship, the first timing type associated with the first time unit index.

In a possible design, the reference subcarrier spacing is a subcarrier spacing of a serving carrier of the first node: the reference subcarrier spacing is a subcarrier spacing of an active bandwidth part BWP of the first node: or the reference subcarrier spacing is a subcarrier spacing indicated by an instruction from the second node.

In a possible design, the first timing type includes any one of the following: An uplink transmission timing is determined based on timing advance (TA) indication information from the second node: an uplink sending timing of a mobile termination (MT) of the first node is aligned with a downlink sending timing of a distributed unit (DU) of the first node: or an uplink receiving timing of the MT of the first node is aligned with a downlink receiving timing of the DU of the first node.

In a possible design, the association relationship between the time unit index and the timing type is associated with an uplink transmission type, and the uplink transmission type includes one or more of a physical uplink shared channel (PUSCH), a physical uplink control channel (PUCCH), or a sounding reference signal (SRS).

According to a seventh aspect, a communication apparatus is provided. The communication apparatus may be a first node, may be an apparatus located in the first node, or may be an apparatus that can be used with the first node. In a design, the communication apparatus may include modules one-to-one that are in correspondence with the methods/operations/steps/actions described in the first aspect. The modules may be hardware circuits, may be software, or may be implemented by using a combination of a hardware circuit and software. In a design, the apparatus may include a processing module and a communication module. The processing module is configured to invoke the communication module to perform a receiving and/or sending function. An example is as follows:

The communication module is configured to receive control information from a second node, where the control information includes scheduling information of sounding reference signal SRS transmission, the control signaling includes first information, and the first information indicates an SRS transmission configuration. The processing module is configured to: determine a first timing type associated with the first information, and determine a transmission timing of uplink transmission based on the first timing type.

In a possible design, the first information further indicates the first timing type.

In a possible design, an association relationship between the first information and the first timing type is specified in a protocol.

According to an eighth aspect, a communication apparatus is provided. The communication apparatus may be a first node, may be an apparatus located in the first node, or may be an apparatus that can be used with the first node. In a design, the communication apparatus may include modules that are in one-to-one correspondence with the methods/operations/steps/actions described in the first aspect. The modules may be hardware circuits, may be software, or may be implemented by using a combination of a hardware circuit and software. In a design, the apparatus may include a processing module and a communication module. The processing module is configured to invoke the communication module to perform a receiving and/or sending function. For example, the processing module is configured to: determine a timing type based on the following rules, and further determine a transmission timing of uplink transmission. The communication module is configured to perform communication based on the transmission timing. The rules include: A timing type 1 is used by default for periodic PUCCH and/or SRS transmission. A common terminal device served by an upper-level node of the first node also determines a transmission timing by using the timing type 1. This facilitates multiplexing of uplink of an IAB node and the common terminal device. The rules may further include: A timing type of the periodic PUCCH and/or SRS transmission is related to a TDD resource transmission direction. In a possible design, if time domain resources/a time domain resource occupied by a PUCCH and/or an SRS in a current period overlap/overlaps a uplink (UL) slot in a second configuration, the first node uses a timing type 2 or a timing type 3.

If the time domain resources/the time domain resource occupied by the PUCCH and/or the SRS in the current period overlap/overlaps a UL slot in a first configuration, the first node uses the timing type 1.

If the UL slot in the first configuration and the UL slot in the second configuration overlap, and the time domain resources/the time domain resource occupied by the PUCCH and/or the SRS in the current period overlap/overlaps UL slots of the first configuration and the second configuration, the first node uses a default timing type. For example, the default timing type is the timing type 1.

The timing type 1 includes: An uplink transmission timing is determined based on timing advance (TA) indication information from a second node. The timing type 2 includes: An uplink sending timing of a mobile termination (MT) of the first node is aligned with a downlink sending timing of a distributed unit (DU) of the first node. The timing type 3 includes: An uplink receiving timing of the MT of the first node is aligned with a downlink receiving timing of the DU of the first node.

According to a fifth aspect, an embodiment of this application provides a communication apparatus. The communication apparatus includes a communication interface and a processor, and the communication interface is used by the communication apparatus to communicate with another device, for example, to receive or receive data or a signal. For example, the communication interface may be a transceiver, a circuit, a bus, a module, or another type of communication interface, and the another device may be a second node or a donor node. The processor is configured to invoke a group of programs, instructions, or data, to perform the method described in any one of the first aspect to the fourth aspect. The apparatus may further include a memory, configured to store the programs, the instructions, or the data invoked by the processor. The memory is coupled to the processor, and the processor may implement the method described in any one of the first aspect to the fourth aspect when executing the instructions or the data stored in the memory.

According to a sixth aspect, an embodiment of this application further provides a computer-readable storage medium, including a computer program or instructions. When the computer program or the instructions is/are run on a computer, the method in any one of the first aspect to the fourth aspect is implemented.

According to a seventh aspect, an embodiment of this application provides a chip system. The chip system includes a processor, and the processor executes a computer program or instructions stored in a memory, to implement the method in any one of the first aspect to the fourth aspect. The chip system may include a chip, or may include a chip and another discrete component.

In a possible design, the processor includes a memory, or the processor is coupled to the memory.

According to an eighth aspect, an embodiment of this application further provides a computer program product, including a computer program or instructions. When the computer program or the instructions is/are run on a computer, the method in any one of the first aspect to the fourth aspect is implemented.

According to a ninth aspect, an embodiment of this application provides a communication system. The communication system includes a first node and a second node, and the first node is configured to perform the method in any one of the first aspect to the fourth aspect.

DESCRIPTION OF EMBODIMENTS

Embodiments of this application provide a transmission timing determining method and apparatus, to determine a transmission timing of an IAB node. The method and the apparatus are based on a same technical idea. Because a problem-resolving principle of the method is similar to a problem-resolving principle of the apparatus, mutual reference may be made to implementation of the apparatus and the method. Repeated parts are not described in detail.

In descriptions of embodiments of this application, the term "and/or" describes an association relationship between associated objects and indicates that three relationships may exist. For example, A and/or B may indicate the following three cases: Only A exists, both A and B exist, and only B exists. A plurality of in this application means two or more. In addition, it should be understood that in the descriptions of this application, terms such as "first" and "second" are merely used for distinguishing and description, but should not be understood as indicating or implying relative importance, or should not be understood as indicating or implying a sequence.

A communication method provided in embodiments of this application may be applied to a 4th generation (4G) communication system, for example, a long term evolution (long term evolution, LTE) system: a 5th generation (5G) communication system, for example, a new radio (NR) system: or various future communication systems, for example, a 6th generation (6G) communication system or a 7th generation (7G) communication system.

The following describes in detail embodiments of this application with reference to accompanying drawings.

Figure 1:
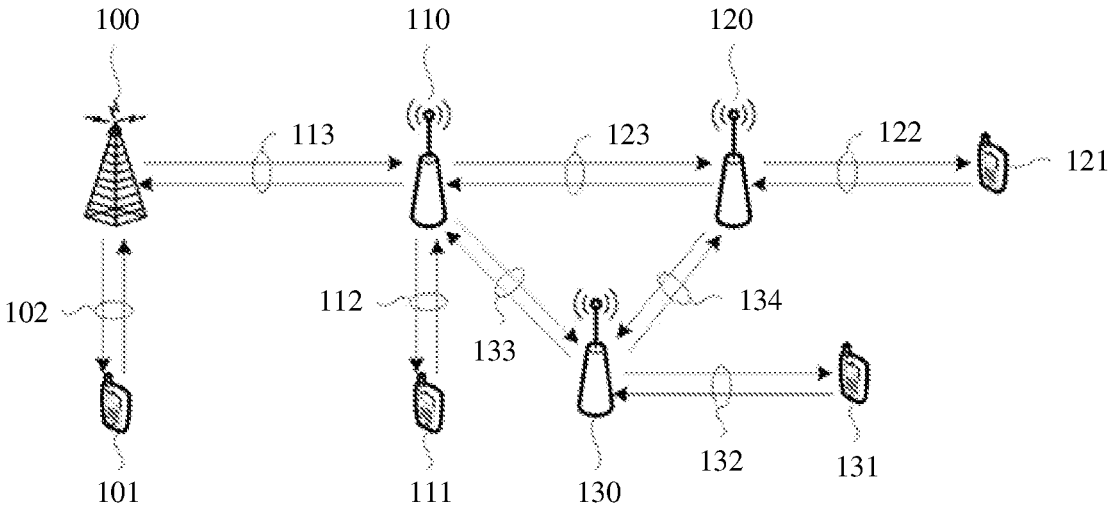
FIG. 1 is a schematic diagram of a structure of a communication system according to an embodiment of this application.

FIG. 1 is a schematic diagram of a structure of a communication system to which an embodiment of this application is applicable. In the communication system shown in FIG. 1, an IAB system is provided. The IAB system includes at least one base station 100, one or more terminals 101 served by the base station 100, one or more relay nodes (RN), and one or more terminals served by the relay node. In this embodiment of this application, the relay node may also be referred to as a relay device, or a relay transmission reception point (relay transmission and reception point, rTRP).

For example, in the IAB system shown in FIG. 1, the relay node includes an rTRP 110, an rTRP 120, an rTRP 130, one or more terminals 111 served by the rTRP 110, one or more terminals 121 served by the rTRP 120, and one or more terminals 131 served by the rTRP 130. Generally, the base station 100 is referred to as a donor base station (donor next generation NodeB, DgNB). The rTRP 110 is connected to the base station 100 through a wireless backhaul link 113. The rTRP 120 is connected to the relay node rTRP 110 through a wireless backhaul link 123 to access a network, and the rTRP 130 is connected to the relay node rTRP 110 through a wireless backhaul link 133 to access the network. The rTRP 120 serves the one or more terminals 121, and the rTRP 130 serves the one or more terminals 131. In FIG. 1, both the relay nodes rTRP 110 and rTRP 120 are connected to the network through the wireless backhaul links. In this application, the wireless backhaul links are viewed from a perspective of the relay node. For example, the wireless backhaul link 113 is a backhaul link of the relay node rTRP 110, and the wireless backhaul link 123 is a backhaul link of the relay node rTRP 120. As shown in FIG. 1, a relay node (for example, the relay node 120) may be connected to another relay node 110 through a wireless backhaul link (for example, the wireless backhaul link 123), to access the network. In addition, the relay node may access the network through a plurality of levels of wireless relay nodes.

In this embodiment of this application, the donor base station may also be referred to as a donor node, or referred to as an IAB donor. The base station includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a new radio base station (for example, a gNB), or the like.

It may be understood that the IAB system may further include more or fewer relay nodes.

Generally, a node that provides a wireless backhaul link resource, for example, the relay node 110, is referred to as an upper-level node of the relay node 120, and the relay node 120 is referred to as a lower-level node of the relay node 110. Usually, the lower-level node may be considered as a terminal of the upper-level node. It should be understood that, in the IAB system shown in FIG. 1, one relay node is connected to one upper-level node. However, in a future relay system, to improve reliability of the wireless backhaul link, a plurality of upper-level nodes simultaneously serve one relay node (for example, the relay node 120). The rTRP 130 in FIG. 1 may further be connected to the relay node rTRP 120 through a backhaul link 134. That is, both the rTRP 110 and the rTRP 120 are upper-level nodes of the rTRP 130. In this application, the terminal 101, the terminal 111, the terminal 121, and the terminal 131 may each be a static or mobile device. For example, the mobile device may be a mobile phone, an intelligent terminal, a tablet computer, a notebook computer, a video game console, a multimedia player, or even a mobile relay node. The static device is usually located at a fixed location, for example, a computer, or an access point (which accesses a network through a wireless link, for example, a static relay node). Names of the relay nodes rTRPs 110, 120, and 130 are not limited in a scenario or a network in which the relay nodes rTRPs 110, 120, and 130 are deployed, and there may be any other name such as a relay or RN. In this application, the rTRP is used only for ease of description.

In FIG. 1, wireless links 102, 112, 122, 132, 113, 123, 133, and 134 may be bidirectional links, including uplink and downlink transmission links. Particularly, the wireless backhaul links 113, 123, 133, and 134 may be used by an upper-level node for serving a lower-level node. For example, the upper-level node 100 provides a wireless backhaul service for the lower-level node 110. It should be understood that an uplink and a downlink of a backhaul link may be separated. To be specific, the uplink and the downlink are not transmitted through a same node. Downlink transmission means that an upper-level node transmits information or data to a lower-level node. For example, the node 100 transmits information or data to the node 110. Uplink transmission means that the lower-level node transmits information or data to the upper-level node.

For example, the node 110 transmits information or data to the node 100. The node is not limited to a network node or a terminal. For example, in a D2D scenario, a terminal may be used as a relay node to serve another terminal. In some scenarios, the wireless backhaul link may also be an access link. For example, the backhaul link 123 may also be considered as an access link of the node 110, and the backhaul link 113 is also an access link of the node 100. It should be understood that the upper-level node may be a base station or a relay node, and the lower-level node may be a relay node or a terminal having a relay function. For example, in the D2D scenario, the lower-level node may also be a terminal.

In FIG. 1, the donor node is a node that may access a core network through the node, or is an anchor base station in a radio access network, and may access the network through the anchor base station. The anchor base station is responsible for processing data at a packet data convergence protocol (PDCP) layer, receiving data from a core network and forwarding the data to a relay node, or receiving data from a relay node and forwarding the data to a core network. The donor node may generally access a network in a wired manner, for example, through an optical fiber.

Figure 2:
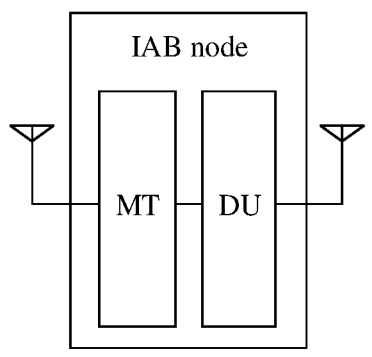
FIG. 2 is a schematic diagram of a structure of an IAB node according to an embodiment of this application.

For any relay node (or any IAB node), two parts are included, and are configured to implement functions similar to those of a base station and functions similar to those of a terminal. Refer to FIG. 2. The IAB node may include a mobile termination (MT) and a distributed unit (DU). The MT is a functional module used for implementing a function similar to that of a common terminal, and is configured to communicate with an upper-level node, for example, send uplink (UL) data to the upper-level node, and receive downlink (DL) data from the upper-level node. The DU is a functional module used for implementing a function similar to that of a common base station, and is configured to communicate with a lower-level node, for example, send downlink (DL) data to the lower-level node, and receive uplink (UL) data from the lower-level node.

To better understand the method provided in embodiments of this application, the following describes technical terms and concepts in embodiments of this application.

(1) Transmission Resources of an MT of an IAB Node

Transmission resources of the MT of the IAB node may be classified into three types: downlink (D), uplink (U), and flexible (F). The three types of resources are also supported by a common terminal, and may be indicated through signaling. Transmission resources of a DU of the IAB node may be classified into three transmission directions: uplink (U), downlink (D), and flexible (F). Resources of the DU may be classified into three types: hard, soft, and not available. A DU hard resource indicates a resource that is always available to the DU, a DU soft resource indicates whether a resource is available to the DU depends on an indication of an upper-level node, and a DU not available resource indicates a resource that is not available to the DU.

(2) Time Domain Duplex (TDD) Uplink-Downlink-Configuration Common

A common terminal (which may be referred to as a terminal for short) can obtain a TDD-uplink-downlink-common configuration (UL-DL-configuration common) from a broadcast message. The TDD-uplink-downlink-common configuration includes a quantity of downlink slots/symbols and a quantity of uplink slots/symbols. In a configuration period, the quantity of downlink slots indicates a quantity of consecutive slots that are counted from a first slot: the quantity of uplink slots indicates a quantity of consecutive slots that are counted backward from a last slot: the quantity of downlink symbols indicates a quantity of consecutive symbols that are counted forward from a first symbol in remaining slots that are not indicated, that is, flexible slots; and the quantity of uplink symbols indicates a quantity of consecutive symbols that are counted backward from a last symbol in the remaining slots that are not indicated, that is, the flexible slots. The symbols described herein all refer to an OFDM symbol in an OFDM system, and an absolute time length of the OFDM symbol is related to a subcarrier spacing. The TDD-uplink-downlink-common configuration indicates that the configuration period starts with a downlink slot and ends with an uplink slot. After the terminal accesses a cell, a base station configures a TDD-uplink-downlink-dedicated (TDD-UL-DL-dedicated) configuration through radio resource control (RRC) signaling, to further indicate a transmission direction of a part of "F" slots or symbols in the TDD configuration configured in the broadcast message.

Figure 3:
FIG. 3 is a schematic diagram of a TDD-uplink-downlink-common configuration according to an embodiment of this application.

The MT of the IAB node may use a resource configuration method of the common terminal, that is, the resource configuration method supports the following: The configuration period starts with a downlink time domain resource and ends with an uplink time domain resource. As shown in FIG. 3, according to the TDD-uplink-downlink-common configuration, a configuration manner that starts with D and ends with U is provided. In FIG. 3, one block may represent one slot. For example, five consecutive slots are used as one configuration period, and each configuration period starts with D and ends with U. In this embodiment of this application, a time domain resource in a unit may be a slot, or may be a symbol or another type of time domain resource. For ease of description, in one configuration period, "a start time domain resource is uplink" may be described as "starting with U", "an end time domain resource is downlink" may be described as "ending with D", "the start time domain resource is downlink" may be described as "starting with D", and "the end time domain resource is uplink" is described as "ending with U".

(3) Spatial Division Multiplexing on an Access Link and a Backhaul Link of the IAB Node Cannot be Implemented Due to a Half-Duplex Constraint.

The IAB node integrates a wireless access link and a wireless backhaul link. The wireless access link is a communication link between user equipment (UE) and the IAB node, the wireless backhaul link is a communication link between IAB nodes and a communication link between the IAB node and an IAB donor, and the wireless backhaul link is used for data backhaul. Therefore, the IAB node does not need a wired transmission network for data backhaul, and the IAB node is more likely to be deployed in a dense urban scenario. This relieves burden of deployment of the wired transmission network. The wireless access link is referred to as an access link for short, and the wireless backhaul link is referred to as a backhaul link for short.

In-band relay is a relay solution in which the backhaul link and the access link share a same frequency band. The in-band relay is generally subject to the half-duplex constraint. Specifically, when receiving a downlink signal sent by an upper-level node of the IAB node, the IAB node cannot send a downlink signal to a lower-level node of the IAB node, while when a relay node receives an uplink signal sent by a lower-level node of the relay node, the relay node cannot send an uplink signal to an upper-level node of the relay node.

Figure 4A:
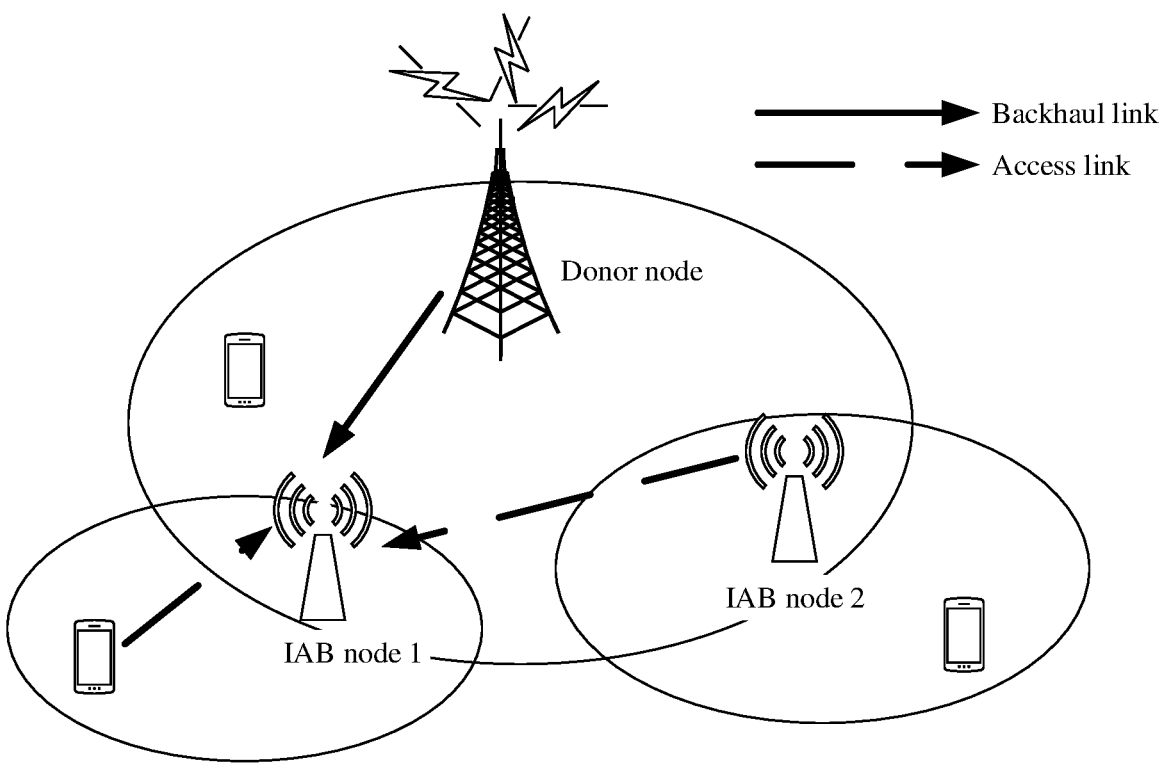
FIG. 4a is a first schematic diagram of spatial multiplexing on an MT and a DU according to an embodiment of this application.
Figures 4B, 5A:
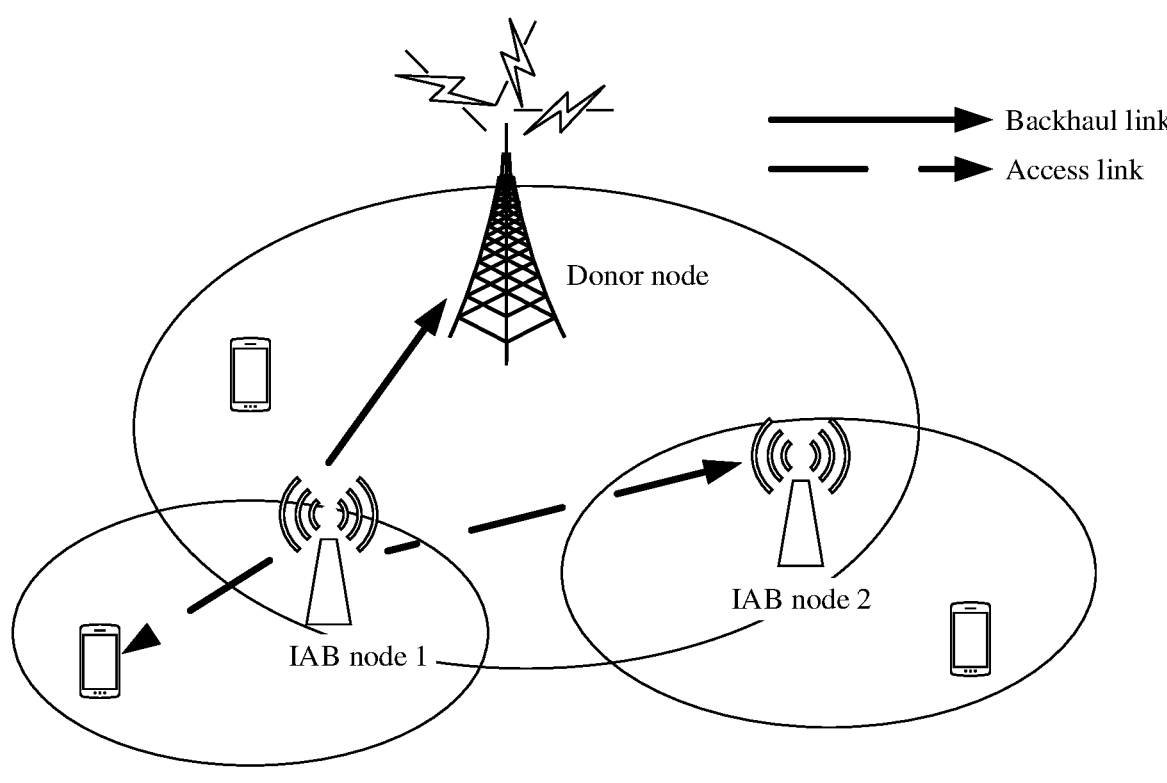
FIG. 4b is a second schematic diagram of spatial multiplexing on an MT and a DU according to an embodiment of this application.
FIG. 5a is a first schematic diagram of a transmission resource configuration in a first manner according to an embodiment of this application.

In a configuration period, a DU sends downlink data to a lower-level node or a terminal on a downlink time domain resource of the DU of the IAB node. That spatial multiplexing is implemented on the DU and the MT of the IAB node means that when the DU performs downlink sending, the MT performs uplink sending; and when the DU performs uplink receiving, the MT performs downlink receiving. As shown in FIG. 4a, when an IAB node 1 receives a downlink sending signal of an upper-level node of the IAB node 1 on a backhaul link, the IAB node 1 may receive an uplink signal sent by a lower-level node of the IAB node 1 or a terminal on an access link at the same time. Simply speaking, when a DU of the IAB node 1 performs uplink receiving, an MT performs downlink receiving: or when the MT of the IAB node 1 performs downlink receiving, the DU performs uplink receiving. As shown in FIG. 4b, when the IAB node 1 sends an uplink signal to the upper-level node of the IAB node 1 on the backhaul link, the IAB node 1 may send a downlink signal to the lower-level node of the IAB node 1 or the terminal on the access link at the same time. Simply speaking, when the DU of the IAB node 1 performs downlink sending, the MT performs uplink sending: or when the MT of the IAB node 1 performs uplink sending, the DU performs downlink sending. FIG. 4a and FIG. 4b are schematically illustrated by using an example in which upper-level node of the IAB node 1 is a donor node, and the upper-level node of the IAB node 1 may alternatively be another IAB node.

When spatial multiplexing is performed on the DU and the MT of the IAB node, the MT of the IAB node may receive or send data on an MT resource corresponding to a downlink time domain resource of the DU. Due to the half-duplex constraint, the IAB node cannot send a downlink signal to the lower-level node of the IAB node when the IAB node receives a downlink signal sent by the upper-level node of the IAB node. Consequently, spatial multiplexing cannot be implemented.

(4) An IAB Node-Dedicated Transmission Resource Configuration is Used to Implement Spatial Multiplexing on the Access Link and the Backhaul Link of the IAB Node.

The IAB node-dedicated transmission resource configuration is provided for the IAB node, and the IAB node-dedicated transmission resource configuration supports the following: A configuration period starts with an uplink time domain resource and ends with a downlink time domain resource. This helps implement spatial multiplexing on the access link and the backhaul link, that is, implement spatial multiplexing on an MT and a DU. The dedicated transmission resource configuration is defined as that the configuration period starts with the uplink time domain resource. The uplink time domain resource includes an uplink slot or an uplink symbol. The dedicated transmission resource configuration may also be defined as that the configuration period starts with a flexible time domain resource, where the flexible time domain resource includes a flexible slot or a flexible symbol.

(5) Transmission Resource Configuration of the MT of the IAB Node

The MT of the IAB node obtains a transmission resource configuration. The transmission resource configuration includes a first configuration and a second configuration. The "configuration" in the first configuration and the second configuration may be a time domain resource configuration, for example, a slot configuration. The "configuration" in the first configuration and the second configuration may be understood as a pattern. In this case, the first configuration may also be referred to as a first pattern, and the second configuration may also be referred to as a second pattern.

The first configuration indicates that a start time domain resource in one configuration period is a downlink resource, indicates that an end time domain resource in one configuration period is an uplink resource, or indicates that a start time domain resource in one configuration period is a downlink resource, and an end time domain resource in one configuration period is an uplink resource.

The second configuration indicates that a start time domain resource in one configuration period is an uplink resource, indicates that an end time domain resource in one configuration period is a downlink resource, or indicates that a start time domain resource in one configuration period is an uplink resource, and an end time domain resource in one configuration period is a downlink resource.

The first configuration may be understood as a TDD-uplink-downlink-common configuration and/or a TDD-uplink-downlink-dedicated (TDD-UL-DL-dedicated) configuration, and the second configuration may be understood as an IAB node-dedicated transmission resource configuration (TDD-UL-DL-dedicated-IAB-MT). The IAB node-dedicated transmission resource configuration may also be referred to as an IAB node-dedicated configuration for short.

Transmission directions of the first configuration and the second configuration are described by using an example. Two TDD periods (namely, configuration periods) are used as an example. One TDD period includes five time domain resources, sequence numbers of time domain resources of a first TDD period are 0 to 4, and sequence numbers of time domain resources of a second TDD period are 5 to 9.

As shown in FIG. 5a, transmission directions of transmission resources of the first configuration in one configuration period may be DDDFU, that is, transmission directions of the first configuration in time domain resources 0 to 4 are DDDFU, and transmission directions of the first configuration in time domain resources 5 to 9 are DDDFU. Transmission directions of transmission resources of the second configuration in one configuration period may be represented as UUUFD, that is, transmission directions of the second configuration in the time domain resources 0 to 4 are UUUFD, and transmission directions of the second configuration in the time domain resources 5 to 9 are UUUFD.

Figure 5B:
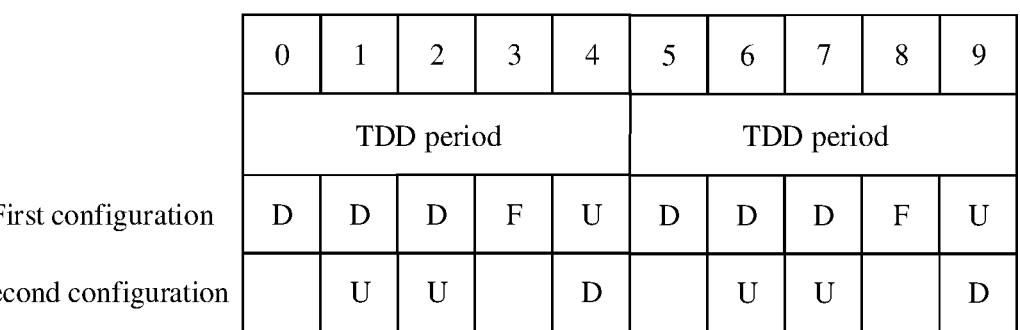
FIG. 5b is a second schematic diagram of a transmission resource configuration in a first manner according to an embodiment of this application.

As shown in FIG. 5b, transmission directions of transmission resources of the first configuration in one configuration period are DDDFU, that is, transmission directions of the first configuration in time domain resources 0 to 4 are DDDFU, and transmission directions of the first configuration in time domain resources 5 to 9 are DDDFU. Transmission directions of the transmission resources of the second configuration in one configuration period may be represented as _UU_D, where "_" represents null, and refers to a hard resource of a DU of the IAB node. In this example, it is assumed that the IAB does not have a multiplexing capability of transmitting and receiving on the MT and the DU at the same time. Therefore, the MT of the IAB node is not expected to be scheduled for transmission at a resource location corresponding to "_".

In FIG. 5a and FIG. 5b, two TDD periods are used as examples. It may be understood that one transmission resource configuration period may further include more or fewer TDD periods.

(6) Timing Type

A timing type refers to a rule that the IAB node follows when the IAB node determines a transmission timing.

For the IAB node, the transmission timing may include an uplink transmission timing and a downlink transmission timing. The uplink transmission timing is specific to the MT, and an uplink transmission timing of the MT includes an uplink sending timing and an uplink receiving timing. The uplink sending timing of the MT is a timing used when the MT performs uplink transmission to a DU of an upper-level node. The uplink receiving timing of the MT is a timing used when the MT receives a signal from the DU of the upper-level node.

In embodiments of this application, an example in which a timing type of an uplink transmission timing is determined is used for description, that is, the IAB node determines a transmission timing of uplink transmission based on the timing type.

The following provides several examples of timing types.

Timing Type 1:

The MT of the IAB node determines the uplink transmission timing based on timing advance (TA) indication information of the upper-level node. A downlink sending timing of the DU of the IAB node is aligned between DUs of different nodes.

Timing Type 2:

An uplink sending timing of the MT of the IAB node is aligned with the downlink sending timing of the DU of the IAB node.

Timing Type 3:

An uplink receiving timing of the MT of the IAB node is aligned with a downlink receiving timing of the DU of the IAB node.

As described in the foregoing point (3), that spatial multiplexing is implemented on the DU and the MT of the IAB node means that when the DU performs downlink sending, the MT performs uplink sending; and when the DU performs uplink receiving, the MT performs downlink receiving. That when the DU performs downlink sending, the MT performs uplink sending may be briefly described as a spatial multiplexing scenario in which the IAB node simultaneously performs sending. That when the DU performs uplink receiving, the MT performs downlink receiving may be briefly described as a spatial multiplexing scenario in which the IAB node simultaneously performs receiving.

The timing type 2 may be applicable to a spatial multiplexing scenario in which the IAB node simultaneously performs sending. The timing type 3 may be applicable to a spatial multiplexing scenario in which the IAB node simultaneously performs receiving. The foregoing timing type 1 may be applicable to a case of time division multiplexing on the MT and the DU of the IAB node.

The foregoing several timing types specify a rule for determining the uplink transmission timing of the MT of the IAB node. In both the timing type 2 and the timing type 3, the uplink transmission timing of the MT is related to a downlink transmission timing of the DU. In this embodiment of this application, the downlink transmission timing of the DU may be determined according to any method. For example, with reference to the timing type 1, the downlink transmission timing of the DU may be aligned with a downlink transmission timing of an IAB donor node. Specifically, the downlink transmission timing of the DU may be indicated and adjusted by an upper-level node based on air interface synchronization signaling (OTA synchronization, OTA refers to over-the-air), or the downlink transmission timing of the DU may be obtained based on a GPS global positioning system or obtained based on another system that supports timing service, such as a GNSS or a BeiDou.

The IAB node may use different timing types in different scenarios. For example, the IAB node may use the first configuration in one TDD period, and may use the second configuration in another TDD period. When the first configuration is used, a transmission timing may be determined by using the timing type 1, and when the second configuration is used, the transmission timing may be determined by using the timing type 2 or the timing type 3. Regardless of which TDD configuration is used by the IAB node, how the IAB node determines a transmission timing of uplink transmission when the IAB node supports a plurality of timing types is a problem that needs to be considered.

The transmission timing determining method provided in embodiments of this application may be used by the IAB node to determine the transmission timing of the uplink transmission. It should be noted that the IAB node is used for description in embodiments of this application, and implementation solutions of the IAB node may be extended to any device having a relay function.

The following describes several implementation methods of the transmission timing determining method provided in embodiments of this application. In the following description, the method is performed by a first node, which may be specifically an MT of the first node. The first node may be a base station, a relay node, an IAB node, a terminal with a relay function, or any device with the relay function.

Figure 6:
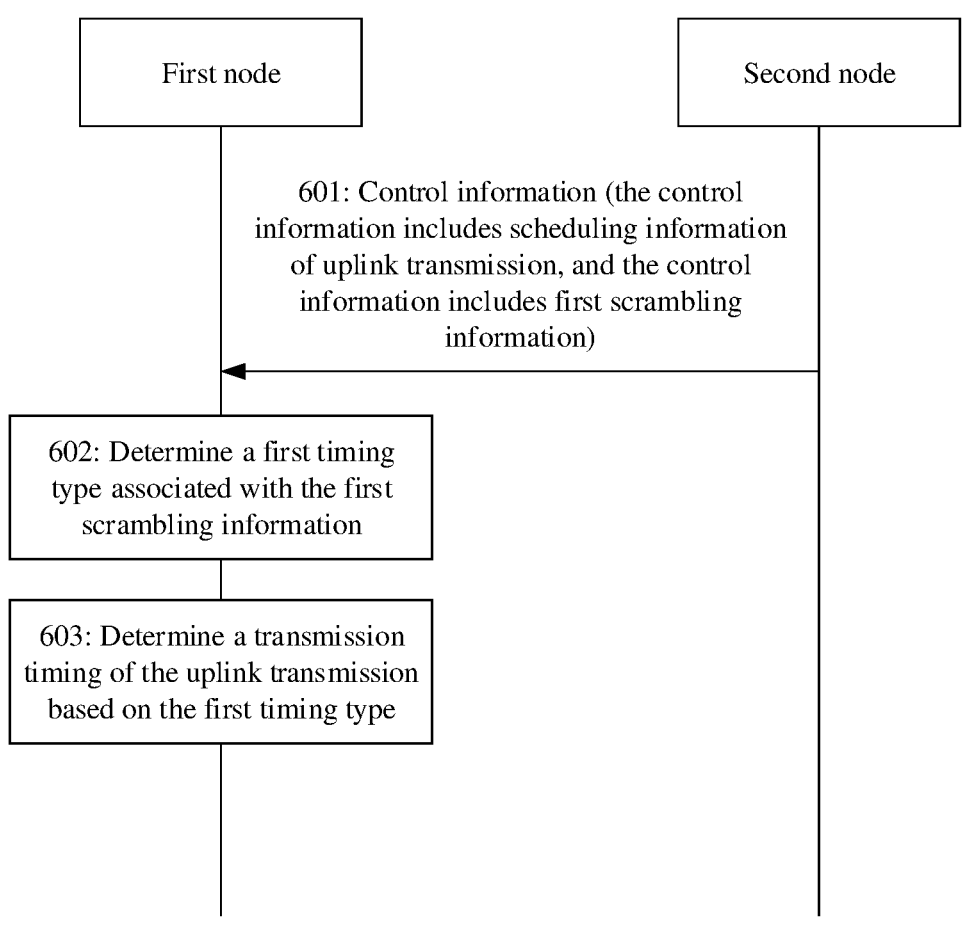
FIG. 6 is a schematic flowchart of a first transmission timing determining method according to an embodiment of this application.

As shown in FIG. 6, a specific procedure of a first transmission timing determining method according to an embodiment of this application is described as follows.

S601: A second node sends control information to the first node, and the first node receives the control information from the second node.

The control information includes scheduling information of uplink transmission, and the control signaling includes first scrambling information. The second node may be an upper-level node of the first node, or may be a donor node.

For example, the control information may be downlink control indication (DCI) signaling carried on a downlink control channel PDCCH. The first scrambling information may be a radio network temporary identifier (RNTI), or the first scrambling information may be a cell-radio network temporary identifier (C-RNTI) or another identifier having a function similar to that of the radio network temporary identifier.

S602: The first node determines a first timing type associated with the first scrambling information.

The first scrambling information has an association relationship with the first timing type. This indicates that the first scrambling information implicitly carries information about the first timing type. After receiving the control information, the first node may determine the first timing type based on the first scrambling information carried in the control information. For example, the control information indicates the MT of the first node to send an uplink signal, and the uplink signal includes at least one of a PUSCH, a PUCCH, and an SRS.

S603: The first node determines a transmission timing of the uplink transmission based on the first timing type.

According to the embodiment in FIG. 6, the first node may determine the first timing type based on the first scrambling information carried in the control information, and determine, based on the first timing type, the transmission timing of the uplink transmission scheduled by the control information. In this way, a timing type is implicitly indicated without adding a redundant field indicating the timing type in the control information.

The following describes some optional implementations of the embodiment in FIG. 6.

Before receiving the control information from the second node, the first node obtains an association relationship between scrambling information and a timing type.

The donor node sends the association relationship between the scrambling information and the timing type to the first node, and the first node receives the association relationship from the donor node. If the donor node is an upper-level node of the first node, the donor node directly generates and sends the association relationship to the first node. If the donor node is not the upper-level node of the first node, the donor node may obtain the association relationship from the upper-level node of the first node, and then send the association relationship to the first node. Alternatively, if the donor node is not the upper-level node of the first node, the donor node directly generates and sends the association relationship to the first node.

The association relationship between the scrambling information and the timing type may be carried in an RRC message. For example, the donor node sends the RRC message to the first node, and adds the association relationship between the scrambling information and the timing type to the RRC message. The first node receives the RRC message from the donor node, and obtains the association relationship between the scrambling information and the timing type from the RRC message.

The donor node further needs to send the association relationship to a DU of the upper-level node of the first node. For example, the donor node sends the association relationship to the DU of the upper-level node of the first node through F1-AP signaling. In this way, the DU of the upper-level node of the first node obtains the association relationship, and determines, based on the association relationship, a transmission timing of downlink transmission. Therefore, the transmission timing of the downlink transmission of the DU of the upper-level node of the first node corresponds to a transmission timing of uplink transmission of an MT of the first node.

The association relationship between the scrambling information and the timing type may be represented by using a table, a function, or in another manner. The table form is used as an example. Table 1 shows relationships between several types of scrambling information and timing types.

TABLE 1

| Timing type (timing mode) | Scrambling information |
|---|---|
| Timing type 1 | Scrambling information value 1 (default or not configured) |
| Timing type 2 | Scrambling information value 2 |
| Timing type 3 | Scrambling information value 3 |

Correspondingly, the timing type 1 may be not configured with scrambling information. That is, after the first node receives the control information, if the C-RNTI in the conventional technology is used for scrambling, the timing type 1 is used by default. The timing type 1 may also correspond to default scrambling information. The scrambling information value 2 is a sequence, and similarly, the scrambling information value 3 is a sequence.

The following describes the method in the embodiment in FIG. 6. It is assumed that the scrambling information is an RNTI, and the control information is DCI. The first node is an IAB node.

The RNTI may be a 16-bit sequence, and is used to scramble a cyclic redundancy check (CRC). When receiving a PDCCH signal at a specified resource location, the IAB node attempts to descramble the CRC by using different RNTIs, determines whether data of the PDCCH is data valid for the IAB node, and further obtains content of the PDCCH if the IAB node determines that the data is the data valid for the IAB node. The C-RNTI is generally used by the IAB node to receive data scheduling for unicast.

The donor node configures an association relationship between the RNTI and a timing type for the IAB node in advance. The association relationship is shown in Table 2.

TABLE 2

| Timing type (timing mode) | RNTI |
|---|---|
| Timing type 1 | C-RNTI (default or not configured) |
| Timing type 2 | RNTI value (value) 1 |
| Timing type 3 | RNTI value 2 |

The RNTI value 1 is a 16-bit binary array or sequence, and is not repeated with a special-purpose RNTI specified in a protocol. The special-purpose RNTI is, for example, a paging-radio network temporary identifier (P-RNTI) or a system information-radio network temporary identifier (-RNTI).

The MT of the IAB node receives a DCI instruction of the upper-level node, where the DCI instruction includes scheduling information of uplink transmission, and the DCI signaling is scrambled by using the RNTI. The IAB node determines, based on the association relationship indicated in Table 2, the timing type associated with the RNTI, and determines a transmission timing of uplink transmission based on the timing type.

For example, the DCI received by the IAB node is scrambled by using the RNTI value 1, and the IAB node determines, based on the association relationship shown in Table 2, the timing type 2 associated with the RNTI value 1. In this case, it may be determined that: An uplink sending timing of the MT of the IAB node is aligned with a downlink sending timing of the DU of the IAB node.

It may be understood that Table 1 and Table 2 show three types of timing types. In actual application, more or fewer timing types may be included. One timing type may be corresponding to one RNTI, or may be corresponding to a plurality of RNTIs.

The timing type in the association relationship may be represented by an index number of the timing type, or may be a specific meaning of the timing type. For example, a meaning of the timing type 1 is that the MT of the IAB node determines an uplink transmission timing based on TA indication information of the upper-level node. A meaning of the timing type 2 is that an uplink sending timing of the MT of the IAB node is aligned with a downlink sending timing of the DU of the IAB node. A meaning of the timing type 3 is that an uplink receiving timing of the MT of the IAB node is aligned with a downlink receiving timing of the DU of the IAB node. A meaning of each timing type may be represented in a table. The IAB node may determine a meaning of the timing type based on a scrambling information value, to further determine the transmission timing.

The timing type in the association relationship may also be represented by a multiplexing mode. For example, as shown in Table 3, the timing type 2 is represented by MT-Tx/DU-Tx, that is, a spatial multiplexing scenario in which the IAB node simultaneously performs sending, and the timing type 3 is represented by MT-Rx/DU-Rx, that is, a spatial multiplexing scenario in which the IAB node simultaneously performs receiving. The timing type 1 may use an RNTI mapping defined in a conventional protocol such as a C-RNTI by default.

TABLE 3

| Multiplexing mode | Scrambling information |
|---|---|
| MT-Tx/DU-Tx | Scrambling information value 2 |
| MT-Rx/DU-Rx | Scrambling information value 3 |

In the embodiment in FIG. 6, a timing type is implicitly indicated by using the scrambling information in the control information, to determine the transmission timing of uplink transmission. The control information includes scheduling information of uplink transmission, and the uplink transmission may be transmission on a physical uplink shared channel (PUSCH), may be transmission on a physical uplink control channel (PUCCH), or may be transmission of a sounding reference signal (SRS).

Figure 7:
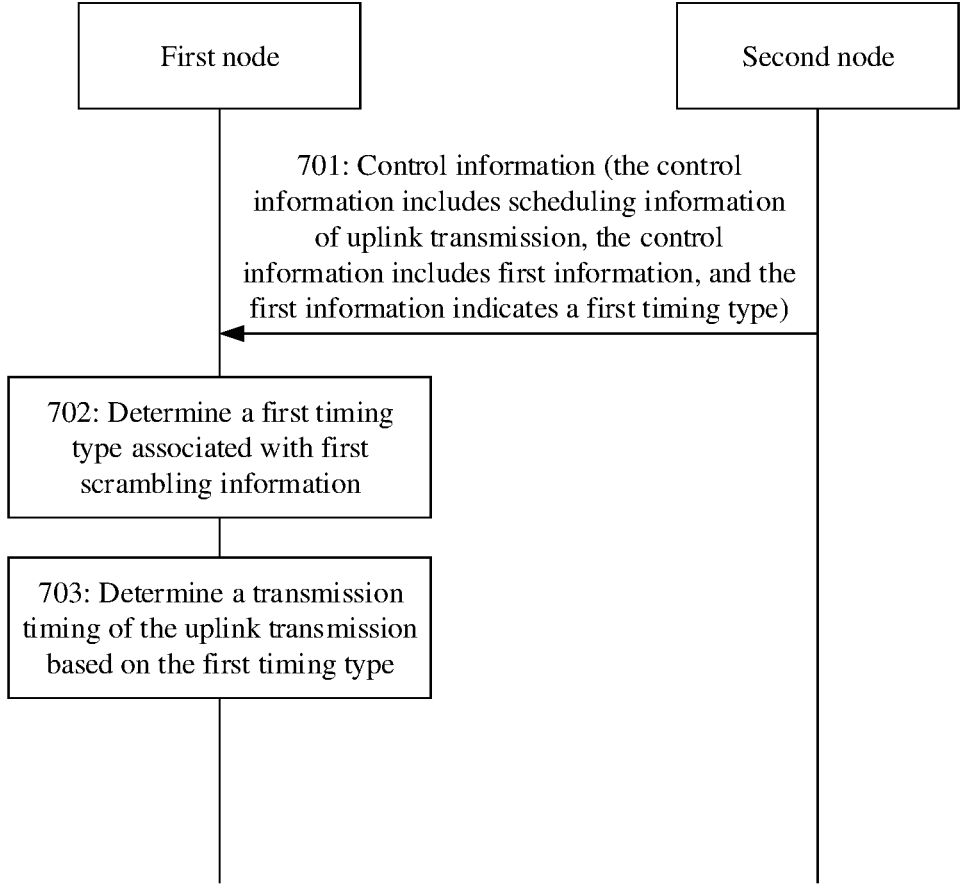
FIG. 7 is a schematic flowchart of a second transmission timing determining method according to an embodiment of this application.

As shown in FIG. 7, a specific procedure of a second transmission timing determining method according to an embodiment of this application is described as follows.

S701: A second node sends control information to the first node, and the first node receives the control information from the second node.

The control information includes scheduling information of uplink transmission, and the control signaling includes first information. The first information indicates a first timing type.

The second node may be an upper-level node of the first node, or may be a donor node.

S702: The first node determines the first timing type based on the control information.

The first node determines the first timing type based on the first information in the control information.

S703: The first node determines a transmission timing of the uplink transmission based on the first timing type.

According to the embodiment in FIG. 7, a timing type may be explicitly indicated in the control information, so that when receiving the control information, the first node can determine, by using the explicitly indicated timing type, the transmission timing of the uplink transmission scheduled by using the control information.

The following describes some optional implementations of the embodiment in FIG. 7.

A field in the control information indicates the timing type. Before receiving the control information from the second node, the first node obtains an association relationship between a codepoint of a bit in the field and the timing type. If the field includes n bits, the field may indicate $2^n$ timing types. For example, the field has two bits in total, and may indicate a maximum of four timing types. The field has three bits in total, and may indicate a maximum of eight timing types.

As shown in Table 4, the field has two bits in total, and an association relationship between a codepoint of the field and a timing type is shown in Table 4. The association relationship is merely an example, and there may be a plurality of different combination forms between the codepoint and the timing type.

TABLE 4

| Timing type | Codepoint (codepoint) of a field |
|---|---|
| Timing type 1 | 00 |
| Timing type 2 | 01 |
| Timing type 3 | 10 |
| Reserved (reserved) | 11 |

Similar to the association relationship in the embodiment in FIG. 6, the timing type in the association relationship may be represented by using an index number of the timing type, may be a specific meaning of the timing type, or may be represented by using a multiplexing mode. For example, as shown in Table 5, the timing type 2 is represented by MT-Tx/DU-Tx, that is, a spatial multiplexing scenario in which the IAB node simultaneously performs sending, and the timing type 3 is represented by MT-Rx/DU-Rx, that is, a spatial multiplexing scenario in which the IAB node simultaneously performs receiving. The timing type 1 may be explicitly indicated, may be indicated by using a default codepoint, or may not be indicated.

TABLE 5

| Multiplexing mode | Codepoint (codepoint) of a first field |
|---|---|
| MT-Tx/DU-Tx | 00 |
| MT-Rx/DU-Rx | 01 |

Before receiving the control information from the second node, the first node receives configuration information from a donor node, where the configuration information includes an association relationship between a codepoint of a field and a timing type. The association relationship between the codepoint of the field and the timing type may also be specified by using a protocol. In this case, the donor node needs to indicate the association relationship.

In a possible design, if the control information received by the first node does not include a field used to explicitly indicate a timing type, the first node uses a default timing type. For example, the control information is format 0_0, format 0_0 is one type of DCI format, can carry little information, and is not suitable to carry the field used to explicitly indicate the timing type. In this case, the first node receives DCI in format 0_0, and determines the transmission timing of the uplink transmission by using the default timing type.

In the embodiment in FIG. 7, the timing type can be explicitly indicated by using the first information in the control information, and the first node can determine the timing type based on the first information that explicitly indicates the timing type, to further determine the transmission timing of the uplink transmission.

In the embodiment in FIG. 7, the uplink transmission may be PUSCH transmission, PUCCH transmission, or SRS transmission.

Based on the embodiment in FIG. 7, the following describes an embodiment in a scenario in which the uplink transmission is the SRS transmission.

The control information includes scheduling information of the SRS transmission, and the first information in the control information indicates an SRS transmission configuration. The first node may determine, based on the first information, the first timing type associated with the first information. The first information may explicitly indicate the first timing type. Alternatively, the association relationship between the first information and the first timing type is specified in a protocol in advance.

For example, for aperiodic SRS transmission, the second node may send DCI signaling to the first node, where the DCI signaling includes an SRS request field, a value of the SRS request field is an SRS resource index, and the SRS resource index indicates a resource used by the first node to send an SRS.

For example, as shown in Table 6, the SRS request field includes two bits, and an SRS resource index 00 indicates that sending of the SRS is not triggered. If the SRS resource index is 01, a first SRS resource set is triggered. If the SRS resource index is 00, a second SRS resource set is triggered. If the SRS resource index is 00, a third SRS resource set is triggered.

TABLE 6

| SRS resource index | Trigger command |
|---|---|
| 00 | Do not trigger |
| 01 | Trigger the first SRS resource set |
| 10 | Trigger the second SRS resource set |
| 11 | Trigger the third SRS resource set |

The protocol may pre-specify the trigger command indicated by the SRS request field. When receiving the DCI signaling, the first node may determine a resource configuration of the SRS based on the SRS resource index in the DCI signaling, and send the SRS based on the resource configuration of the SRS.

In a possible embodiment, the timing type indicated by the SRS request field may be specified in a protocol in advance. When receiving the DCI signaling, the first node may determine a corresponding timing type based on the SRS resource index in the DCI signaling, and determine an SRS transmission timing based on the timing type. A possible correspondence is shown in Table 7. There are other types of combinations of the SRS resource set and the timing type.

TABLE 7

| SRS resource index | Trigger command/Timing type |
|---|---|
| 00 | Do not trigger |
| 01 | Trigger the first SRS resource set/the timing type 1 |
| 10 | Trigger the second SRS resource set/the timing type 2 |
| 11 | Trigger the third SRS resource set/the timing type 3 |

21

In this way, the SRS resource index may indicate the timing type.

In another possible embodiment, the second node may indicate the timing type to the first node, or the SRS resource index may be reused. In this way, apart from a bit that is occupied by an existing SRS resource index, a bit needs to be added, to indicate the timing type on a basis of indicating a resource configuration. It is assumed that there are three types of timing types. For example, in Table 6, one or more bits need to be added apart from the bit occupied by the SRS resource index, to indicate the timing type. For example, one bit is added, that is, the SRS resource index is three bits. For example, the SRS resource index may be shown in Table 8.

TABLE 8

| SRS resource index | Trigger command/Timing type |
|---|---|
| 000 | Do not trigger |
| 001 | Trigger the first SRS resource set/the timing type 1 |
| 010 | Trigger the second SRS resource set/the timing type 1 |
| 011 | Trigger the third SRS resource set/the timing type 1 |
| 100 | Trigger the first SRS resource set/the timing type 2 |
| 101 | Trigger the second SRS resource set/the timing type 2 |
| 110 | Trigger the third SRS resource set/the timing type 3 |
| 111 | Trigger the third SRS resource set/the timing type 3 |

The SRS resource index is three bits, and may indicate eight combination relationships between SRS resource sets and timing types. All combination relationships between three SRS resource sets and three timing types cannot be exhaustively listed. The SRS resource index may be extended to more bits, to indicate more combination relationships. A quantity of bits of the SRS resource index may be configured according to actual application.

It may be understood that, when the control information indicates transmission of another type of reference signal, a method for indicating a timing type is similar to a method for indicating an aperiodic SRS by using DCI, and the method for indicating the timing type may be obtained by analogy.

Figures 8, 9:
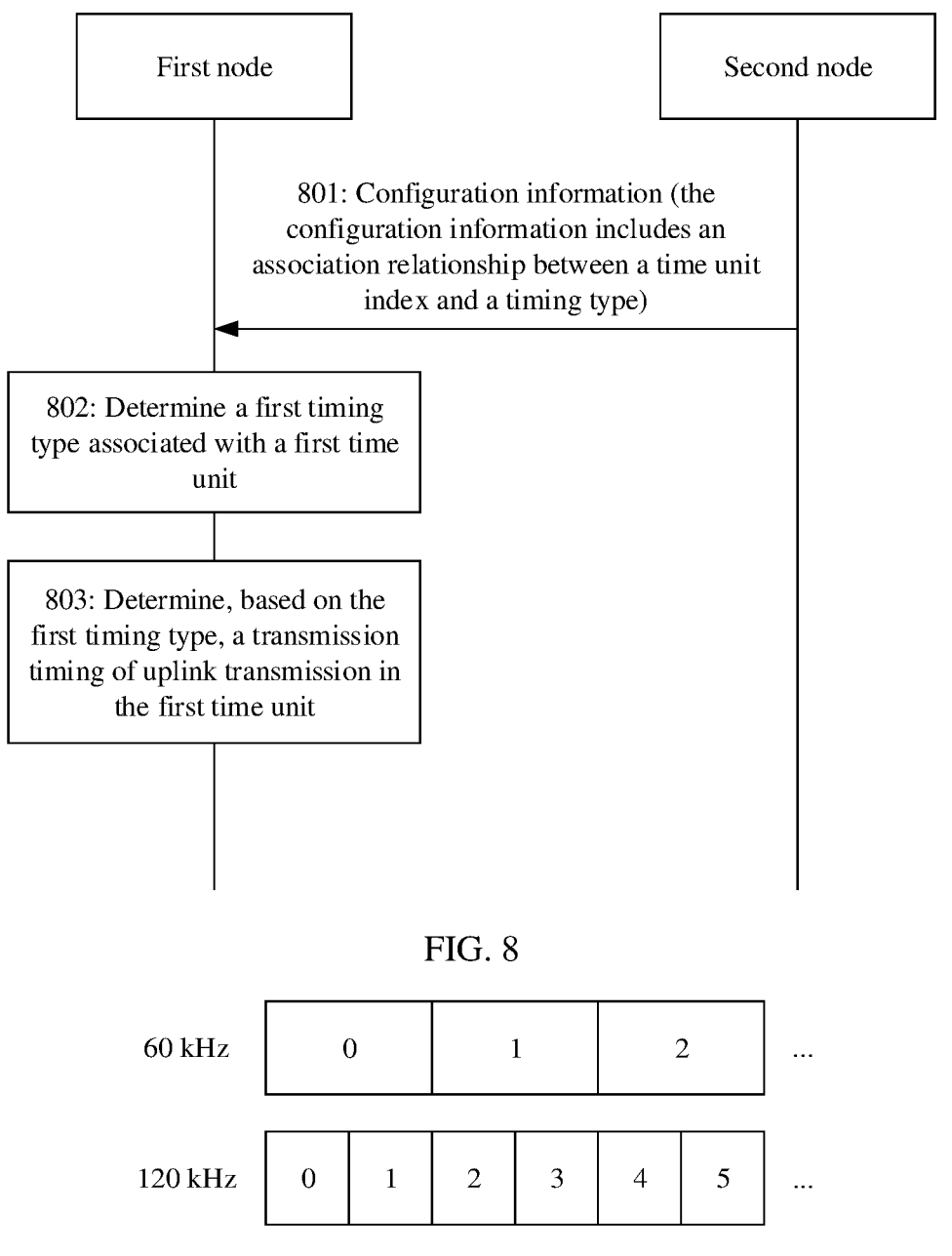
FIG. 8 is a schematic flowchart of a third transmission timing determining method according to an embodiment of this application.
FIG. 9 is a schematic diagram of a correspondence between slot sequence numbers included in 60 KHz and 120 kHz system frames according to an embodiment of this application.

As shown in FIG. 8, a specific procedure of a third transmission timing determining method according to an embodiment of this application is described as follows.

S801: A second node sends configuration information to a first node, and the first node receives the configuration information from the second node.

The configuration information includes an association relationship between a time unit index and a timing type.

S802: The first node determines, based on the association relationship, a first timing type associated with a first time unit.

S803: The first node determines, based on the first timing type, a transmission timing for performing uplink transmission in the first time unit.

The time unit may be a slot, or may be a subframe, a symbol, a system frame, or another type of time domain resource. For example, the time unit is the slot, and the configuration information includes an association relationship between a slot index and a timing type.

The second node may be a donor node or an upper-level node. One system frame includes a plurality of slots, and an association relationship between one or more slot indexes and timing types may be configured by using the configuration information.

A quantity of slots included in the system frame varies at different subcarrier spacings. The association relationship included in the configuration information may be an association relationship between a slot index and a timing type in a reference subcarrier.

The first node may determine the first timing type associated with the first time unit based on the reference subcarrier spacing, a subcarrier spacing corresponding to the first time unit, and the association relationship. For example, the first node may determine, based on the subcarrier spacing corresponding to the first time unit, a first time unit index that corresponds to the first time unit and that is at the reference subcarrier spacing, and determine, based on the association relationship, the first timing type associated with the first time unit index.

For example, the reference subcarrier spacing is 60 kHz, the first time unit is a first slot, and a subcarrier spacing corresponding to the first slot is 120 kHz. A quantity of slots included in a 60 kHz system frame is different from that included in a 120 kHz system frame. The quantity of slots included in the 60 kHz system frame is 40, and the quantity of slots included in the 120 kHz system frame is 80. FIG. 9 shows a correspondence between slot sequence numbers included in the 60 kHz system frame and the 120 kHz system frame.

The association relationship included in the configuration information obtained by the first node is an association relationship between a slot index at 60 kHz and a timing type. For example, at 60 kHz, a slot index 0 corresponds to a timing type 1, a slot index 1 corresponds to a timing type 2, and a slot index 2 corresponds to a timing type 3. In this case, if the first node wants to determine a timing type corresponding to the first slot, the first node needs to first determine a slot index that corresponds to the first slot and that is at the reference subcarrier. It is assumed that the first slot is a slot sequence number 2 at 120 kHz, the first node determines that the slot sequence number 2 at 120 kHz corresponds to the slot index 1 at 60 kHz, and further determines that the slot index 1 at 60 kHz corresponds to the timing type 2, so that the first node may determine that the slot sequence number 2 at 120 kHz corresponds to the timing type 2.

The subcarrier spacing corresponding to the first time unit is a subcarrier spacing at which the first node actually performs uplink transmission. When the subcarrier spacing at which the first node actually performs transmission is the reference subcarrier spacing, the first node may directly determine the associated first timing type based on the first slot.

There may be several types of reference subcarrier spacings, and the first node may obtain a type of the reference subcarrier spacing in advance.

The reference subcarrier spacing may be a subcarrier spacing of a serving carrier of the first node. Alternatively, the reference subcarrier spacing may be a subcarrier spacing of an active bandwidth part (BWP) of the first node. Alternatively, the reference subcarrier spacing may be a subcarrier spacing indicated by an instruction from the second node. For example, the reference subcarrier spacing may be indicated by using the configuration information in S801, or may be indicated by using other signaling.

The following describes the association relationship between the time unit index and the timing type by using an example. A time unit still uses a slot as an example. Table 9a or Table 9b shows an association relationship between a slot index and a timing type.

TABLE 9a

| Slot index | Timing type |
|------------|-------------|
|            | Timing type 1 |
| 3, 5, 7    | Timing type 2 |
| 11, 13, 27 | Timing type 3 |

TABLE 9b

| Slot index | Timing type |
|------------|-------------|
| 3, 5, 7    | Timing type 1 |
|            | Timing type 2 |
| 11, 13, 27 | Timing type 3 |

It may be understood that the association relationship between the time unit index and the timing type may indicate some time units in a system frame, and a default timing type is used for an unindicated time unit. In Table 9a, slot indexes 3, 5, and 7 correspond to the timing type 2, slot indexes 11, 13, and 27 correspond to the timing type 3, and other unindicated slot indexes correspond to the timing type 1 or another default timing type.

Similar to the foregoing description, the timing type in the association relationship may be represented by using an index number of the timing type, may be a specific meaning of the timing type, or may be represented by using a multiplexing mode. For example, as shown in Table 10, the timing type 2 is represented by MT-Tx/DU-Tx, that is, a spatial multiplexing scenario in which the IAB node simultaneously performs sending, and the timing type 3 is represented by MT-Rx/DU-Rx, that is, a spatial multiplexing scenario in which the IAB node simultaneously performs receiving.

TABLE 10

| Multiplexing mode | Slot index |
|-------------------|------------|
| MT-Tx/DU-Tx       | 3, 5, 7    |
| MT-Rx/DU-Rx       | 11, 13, 27 |

If the slot index is not configured, the timing type 1 may be used by default.

The configuration information in the embodiment in FIG. 8 includes the association relationship between the time unit index and the timing type, and may be configured for one or more uplink transmission types. For example, the association relationship may be an association relationship corresponding to PUSCH transmission, may be an association relationship corresponding to PUCCH transmission, or may be an association relationship corresponding to SRS transmission. Alternatively, a plurality of uplink transmission types may correspond to a same association relationship. For example, the PUSCH transmission, the PUCCH transmission, and the SRS transmission all correspond to a same association relationship.

Optionally, an uplink transmission type to which the configuration information is specific may be specified in a protocol, or may be explicitly indicated. For example, the configuration information may further carry a channel corresponding to the association relationship or a corresponding uplink transmission type.

S801: The second node sends the configuration information to a first node, where the second node may be a donor node. The donor node sends the configuration information to the first node. The configuration information may be an RRC message, or the configuration information may be carried in the RRC message. For example, the donor node sends the RRC message to the first node, and adds an association relationship between a time unit index and a timing type to the RRC message. The first node receives the RRC message from the donor node, and obtains the association relationship between the time unit index and the timing type from the RRC message.

The donor node further needs to send the association relationship to a DU of an upper-level node of the first node. For example, the donor node sends the association relationship to the DU of the upper-level node of the first node through F1-AP signaling. In this way, the DU of the upper-level node of the first node obtains the association relationship, and determines, based on the association relationship, a transmission timing of downlink transmission. Therefore, the transmission timing of the downlink transmission of the DU of the upper-level node of the first node corresponds to a transmission timing of uplink transmission of an MT of the first node.

The following provides a transmission timing determining method for a specific uplink transmission type.

1. Preconfigured Grant (ConfiguredGrant) PUSCH

A ConfiguredGrant PUSCH is a preconfigured resource that is periodically used for uplink data transmission, and does not require DCI for scheduling. The ConfiguredGrant PUSCH is also referred to as grant-free uplink transmission or semi-persistent scheduling.

The ConfiguredGrant PUSCH includes two types. A type 1 ConfiguredGrant PUSCH resource refers to a periodic PUSCH resource configured by a base station through RRC signaling. In this embodiment of this application, the second node may configure a periodic PUSCH resource for the first node through the RRC signaling. For the type 1 ConfiguredGrant PUSCH, the foregoing default uplink transmission timing may be used. For example, an uplink transmission timing is determined by using the timing type 1 by default. Alternatively, when configuring the ConfiguredGrant PUSCH resource through the RRC message, the second node may explicitly indicate a timing type. For example, the RRC message carries configuration information of the ConfiguredGrant PUSCH resource, and the configuration information includes a field that indicates the timing type.

A type 2 ConfiguredGrant PUSCH refers to a periodic PUSCH resource that is configured by the second node for the first node through the RRC signaling, and requires the DCI to activate the ConfiguredGrant PUSCH. For the type 2 ConfiguredGrant PUSCH, a timing type may be determined based on the scrambling information carried in the DCI. Refer to the method in the embodiment in FIG. 6. For a method for determining, by the first node, a timing type associated with the scrambling information carried in the DCI and an association relationship between the scrambling information and the timing type, and how the first node determines the timing type based on the association relationship, refer to descriptions of the embodiment in FIG. 6. The scrambling information may be a CS-RNTI.

In a possible implementation, a timing type of the type 2 ConfiguredGrant PUSCH may also be determined in the following manner: A ConfiguredGrant configuration index (ConfigIndex) is index numbers of a group of resource configurations in a protocol, and an association relationship between an index of a resource configuration and a timing type may be set. The association relationship may be specified in the protocol in advance, or may be sent by the second node to the first node. When learning the ConfiguredGrant ConfigIndex based on the association relationship between the index of the resource configuration and the timing type, the first node may determine a timing type associated with the ConfiguredGrant ConfigIndex, and may further determine a transmission timing for transmitting a PUSCH by using the timing type on a resource corresponding to the ConfiguredGrant ConfigIndex.

2. PUCCH and/or SRS

If the first node may determine a timing type of a PUSCH and a transmission timing for transmitting the PUSCH, when the first node further sends a PUCCH and/or an SRS, the first node may determine a transmission timing of the PUCCH and/or the SRS in the following manner. The timing type of the PUSCH may be determined by using the method in any one of the foregoing embodiments in FIG. 6, FIG. 7, or FIG. 8.

Manner 1: A transmission timing of a PUCCH and/or an SRS associated with a PUSCH follows a transmission timing of the PUSCH. For example, if the PUCCH transmits information used to control the PUSCH, the PUCCH is associated with the PUSCH. For another example, if the SRS is a reference signal used for PUSCH transmission, the SRS is associated with the PUSCH.

Alternatively, when the PUCCH and/or the SRS and the PUSCH are located in a same slot, the transmission timing of the PUCCH and/or the SRS is determined based on the timing type of the PUSCH. For example, the timing type of the PUSCH may be determined by using the method in the embodiment in FIG. 6. The first node receives the control information, determines the first timing type associated with the first scrambling information, and determines the transmission timing of the PUSCH based on the first timing type. The first node may further determine the transmission timing of the PUCCH and/or the SRS in a transmission slot of the PUSCH based on the first timing type. Alternatively, a transmission timing of the PUCCH and/or the SRS transmitted in a same slot as the PUSCH is the same as the transmission timing of the PUSCH.

Manner 2: On a basis specified in the manner 1, if no PUSCH transmission exists in a transmission slot of the PUCCH and/or the SRS, the transmission timing of the PUCCH and/or the SRS is determined based on a default timing type. For example, the default timing type is the timing type 1. Alternatively, on a basis specified in the manner 1, if no PUSCH transmission exists in a transmission slot of the PUCCH and/or the SRS, the PUCCH and/or the SRS are/is not sent in this period.

PUCCH transmission and/or SRS transmission that meet/meets the foregoing manner 1 may be periodical or may be triggered by control signaling.

In addition, if the PUCCH transmission and/or the SRS transmission are/is triggered by the control signaling, the PUCCH transmission and/or the SRS transmission may also be determined by using the method in any embodiment of FIG. 6, FIG. 7, or FIG. 8.

Manner 3: The timing type 1 is used by default for periodic PUCCH and/or SRS transmission. A common terminal device served by an upper-level node of the first node also determines a transmission timing by using the timing type 1. This facilitates multiplexing of uplink of the IAB node and the common terminal device. Using the timing type 1 also helps to reduce interference in a network.

Manner 4: A timing type of periodic PUCCH and/or SRS transmission is related to a TDD resource transmission direction.

If time domain resources/a time domain resource occupied by a PUCCH and/or an SRS in a current period overlap/overlaps a UL slot in the second configuration, the first node uses the timing type 2 or the timing type 3.

If the time domain resources/the time domain resource occupied by the PUCCH and/or the SRS in the current period overlap/overlaps a UL slot in a first configuration, the first node uses the timing type 1.

If the UL slot in the first configuration and the UL slot in the second configuration overlap, and the time domain resources/the time domain resource occupied by the PUCCH and/or the SRS in the current period overlap/overlaps UL slots of the first configuration and the second configuration, the first node uses a default timing type. For example, the default timing type is the timing type 1.

To implement functions in the method provided in the foregoing embodiment of this application, the first node may include a hardware structure and/or a software module, to implement the foregoing functions by using the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 10:
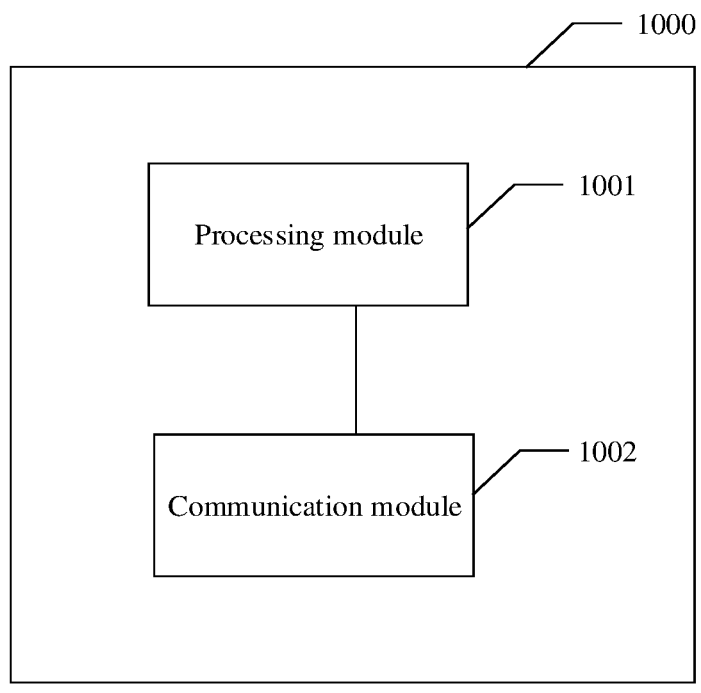
FIG. 10 is a first schematic diagram of a structure of a communication apparatus according to an embodiment of this application.

As shown in FIG. 10, based on a same technical idea, an embodiment of this application further provides a communication apparatus 1000. The communication apparatus 1000 may be the foregoing first node, may be an apparatus in the first node, or may be an apparatus that can be used with the first node. In a design, the communication apparatus 1000 may include modules corresponding to performing the methods/operations/steps/actions performed by the first node in the foregoing method embodiment. The modules may be hardware circuits, may be software, or may be implemented by using a combination of a hardware circuit and software. In a design, the apparatus may include a processing module 1001 and a communication module 1002.

In an embodiment, the communication module 1002 is configured to receive control information from a second node, where the control information includes scheduling information of uplink transmission, and the control signaling includes first scrambling information.

The processing module 1001 is configured to: determine a first timing type associated with the first scrambling information, and determine a transmission timing of uplink transmission based on the first timing type.

In another embodiment, the communication module 1002 is configured to receive configuration information from a second node, where the configuration information includes an association relationship between a time unit index and a timing type.

The processing module 1001 is configured to: determine, based on the association relationship, a first timing type associated with a first time unit; and determine, based on the first timing type, a transmission timing for performing uplink transmission in the first time unit.

In another embodiment, the communication module 1002 is configured to receive control information from a second node, where the control information includes scheduling information of sounding reference signal SRS transmission, the control signaling includes first information, and the first information indicates an SRS transmission configuration.

The processing module 1001 is configured to: determine a first timing type associated with the first information, and determine a transmission timing of uplink transmission based on the first timing type.

The processing module 1001 and the communication module 1002 may be further configured to perform other corresponding steps or operations performed by the first node in the foregoing method embodiment. Details are not described herein again.

Division into the modules in embodiments of this application is an example, is merely division into logical functions, and may be other division during actual implementation. In addition, functional modules in embodiments of this application may be integrated into one processor, each of the modules may exist alone physically, or two or more modules may be integrated into one module. The integrated module may be implemented in a form of hardware, or may be implemented in a form of a software functional module.

Figure 11:
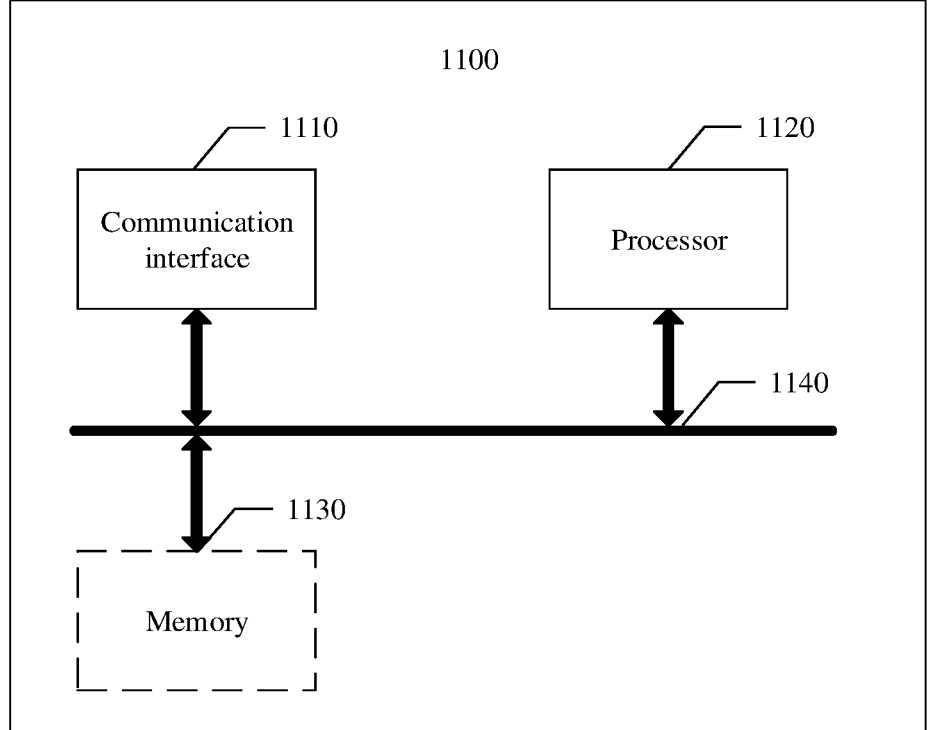
FIG. 11 is a second schematic diagram of a structure of a communication apparatus according to an embodiment of this application.

FIG. 11 shows a communication apparatus 1100 according to an embodiment of this application. The communication apparatus 1100 is configured to implement a function of the first node in the foregoing method. The apparatus may be the first node, may be an apparatus in the first node, or may be an apparatus that can be used with the first node. The apparatus may be a chip system. In this embodiment of this application, the chip system may include a chip, or may include a chip and another discrete component. The communication apparatus 1100 includes at least one processor 1120 and is configured to implement a function of the first node in the method provided in embodiments of this application. The communication apparatus 1100 may further include a communication interface 1110. In this embodiment of this application, the communication interface may be a transceiver, a circuit, a bus, a module, or a communication interface of another type, and is configured to communicate with another device through a transmission medium. For example, the communication interface 1110 is used by an apparatus in the communication apparatus 1100 to communicate with another device. For example, when the communication apparatus 1100 is the first node, the another apparatus may be a second node or a donor node. The processor 1120 receives and sends data through the communication interface 1110, and is configured to implement the method in the foregoing method embodiments.

In an embodiment, the communication interface 1110 is configured to receive control information from a second node, where the control information includes scheduling information of uplink transmission, and the control signaling includes first scrambling information. The processor 1120 is configured to: determine a first timing type associated with the first scrambling information, and determine a transmission timing of the uplink transmission based on the first timing type.

Optionally, the communication interface 1110 is further configured to receive, from a donor node, an association relationship between scrambling information and a timing type.

When determining the first timing type associated with the first scrambling information, the processor 1120 is configured to determine, based on the association relationship, the first timing type associated with the first scrambling information.

Optionally, the first timing type includes any one of the following:

An uplink transmission timing is determined based on timing advance (TA) indication information from the second node: an uplink sending timing of a mobile termination (MT) of the first node is aligned with a downlink sending timing of a distributed unit (DU) of the first node: or an uplink receiving timing of the MT of the first node is aligned with a downlink receiving timing of the DU of the first node.

Optionally, the uplink transmission is PUSCH transmission.

The communication interface 1110 is further configured to:

send a physical uplink control channel PUCCH and/or an uplink sounding reference signal SRS, where when the PUCCH and/or the SRS and a PUSCH are located in a same slot, a transmission timing of the PUCCH and/or the SRS is determined based on the first timing type.

Optionally, the processor 1120 is further configured to:

if no PUSCH transmission exists in a transmission slot of the PUCCH and/or the SRS, determine the transmission timing of the PUCCH and/or the SRS based on a default timing type.

Optionally, the control information is used to activate preconfigured granted PUSCH transmission.

In another embodiment, the communication interface 1110 is configured to receive configuration information from a second node, where the configuration information includes an association relationship between a time unit index and a timing type.

The processor 1120 is configured to: determine, based on the association relationship, a first timing type associated with a first time unit, and determine, based on the first timing type, a transmission timing for performing uplink transmission in the first time unit.

Optionally, the time unit index is an index determined at a reference subcarrier spacing.

When determining, based on the association relationship, the first timing type associated with the first time unit, the processor 1120 is specifically configured to:

determine the first timing type associated with the first time unit based on the reference subcarrier spacing, a subcarrier spacing corresponding to the first time unit, and the association relationship.

Optionally, when determining the first timing type associated with the first time unit based on the reference subcarrier spacing, the subcarrier spacing corresponding to the first time unit, and the association relationship, the processor 1120 is specifically configured to:

determine, based on the subcarrier spacing corresponding to the first time unit, a first time unit index that corresponds to the first time unit and that is at the reference subcarrier spacing; and determine, based on the association relationship, the first timing type associated with the first time unit index.

Optionally, the reference subcarrier spacing is a subcarrier spacing of a serving carrier of the first node: the reference subcarrier spacing is a subcarrier spacing of an active bandwidth part BWP of the first node: or the reference subcarrier spacing is a subcarrier spacing indicated by an instruction from the second node.

Optionally, the first timing type includes any one of the following:

An uplink transmission timing is determined based on timing advance (TA) indication information from the second node: an uplink sending timing of a mobile termination (MT) of the first node is aligned with a downlink sending timing of a distributed unit (DU) of the first node: or an uplink receiving timing of the MT of the first node is aligned with a downlink receiving timing of the DU of the first node.

Optionally, the association relationship between the time unit index and the timing type is associated with an uplink transmission type, and the uplink transmission type includes one or more of a physical uplink shared channel PUSCH, a physical uplink control channel PUCCH, or a sounding reference signal SRS.

In another embodiment, the communication interface 1110 is configured to receive control information from a second node, where the control information includes scheduling information of sounding reference signal SRS transmission, the control signaling includes first information, and the first information indicates an SRS transmission configuration.

The processor 1120 is configured to: determine a first timing type associated with the first information, and determine a transmission timing of uplink transmission based on the first timing type.

Optionally, the first information further indicates the first timing type.

Optionally, an association relationship between the first information and the first timing type is specified in a protocol.

The communication apparatus 1100 may further include at least one memory 1130, configured to store program instructions and/or data. The memory 1130 is coupled to the processor 1120. The coupling in this embodiment of this application may be an indirect coupling or a communication connection between apparatuses, units, or modules in an electrical form, a mechanical form, or another form, and is used for information exchange between the apparatuses, the units, or the modules. The processor 1120 may operate in cooperation with the memory 1130. The processor 1120 may execute the program instructions stored in the memory 1130. At least one of the at least one memory may be included in the processor.

A specific connection medium between the communication interface 1110, the processor 1120, and the memory 1130 is not limited in this embodiment of this application. In this embodiment of this application, the memory 1130, the processor 1120, and the communication interface 1110 are connected to each other through a bus 1140 in FIG. 11. The bus is represented by using a thick line in FIG. 11. A connection manner between other components is schematically described, and is not limited thereto. The bus may be classified into an address bus, a data bus, a control bus, and the like. For ease of representation, only one bold line is used to represent the bus in FIG. 11, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory may be a non-volatile memory, for example, a hard disk drive (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store the program instructions and/or the data.

When the communication apparatus 1000 and the communication apparatus 1100 are specifically chips or chip systems, the communication module 1902 and the communication interface 1110 may output or receive a baseband signal. When the apparatus 1000 and the apparatus 1100 are specifically devices, the communication module 1002 and the communication interface 1110 may output or receive a radio frequency signal.

An embodiment of this application provides a computer storage medium, storing a computer program. The computer program includes instructions used to perform the transmission resource configuration method provided in the foregoing embodiment.

An embodiment of this application provides a computer program product including instructions. When the computer program product runs on a computer, the computer is enabled to perform the transmission resource configuration method provided in the foregoing embodiment.

An embodiment of this application further provides a chip. The chip includes a processor and an interface circuit. The interface circuit is coupled to the processor. The processor is configured to run a computer program or instructions, to implement the foregoing transmission resource configuration. The interface circuit is configured to communicate with another module outside the chip.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer-readable memory that can indicate the computer or the another programmable data processing device to operate in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or the another programmable data processing device, so that a series of operations and steps are performed on the computer or another programmable device, to generate computer-implemented processing.

Therefore, the instructions executed on the computer or the another programmable device provide steps for implementing a specific function in one or more procedures in the flowcharts and/or in one or more blocks in the block diagrams.

Although some preferred embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application.

Clearly, a person skilled in the art can make various modifications and variations to embodiments of this application without departing from the spirit and scope of embodiments of this application. This application is intended to cover these modifications and variations provided that they fall within the scope of protection defined by the following claims and their equivalent technologies.

What is claimed is:

1. A transmission timing determining method, comprising:

receiving, by a first node, configuration information from a second node, wherein the configuration information comprises an association relationship between a time unit index and a timing type;

determining, by the first node based on the association relationship, a first timing type associated with a first time unit; and determining, by the first node based on the first timing type, a transmission timing for performing uplink transmission in the first time unit, wherein the time unit index is an index determined at a reference subcarrier spacing; and the determining, by the first node based on the association relationship, a first timing type associated with a first time unit comprises:

determining, by the first node, the first timing type associated with the first time unit based on the reference subcarrier spacing, a subcarrier spacing corresponding to the first time unit, and the association relationship.

2. The method according to claim 1, wherein the first timing type comprises any one of timing type 1, timing type 2 and timing type 3.

3. The method according to claim 2, wherein the first timing type is represented with two bits, and wherein the two bits corresponding to the timing type 1 are 00, the two bits corresponding to the timing type 2 are 01, and the two bits corresponding to the timing type 3 are 10.

4. The method according to claim 1, wherein the association relationship between the time unit index and the timing type indicates a relationship between some time units in a system frame and the timing type, and wherein an unindicated time unit in the system frame corresponds to a default timing type.

5. The method according to claim 1, wherein the determining, by the first node, the first timing type associated with the first time unit based on the reference subcarrier spacing, a subcarrier spacing corresponding to the first time unit, and the association relationship comprises:

determining, by the first node based on the subcarrier spacing corresponding to the first time unit, a first time unit index that corresponds to the first time unit and that is at the reference subcarrier spacing; and determining, by the first node based on the association relationship, the first timing type associated with the first time unit index.

6. The method according to claim 1, wherein the first timing type comprises any one of the following:

an uplink transmission timing that is determined based on timing advance (TA) indication information from the second node;

an uplink sending timing of a mobile termination (MT) of the first node that is aligned with a downlink sending timing of a distributed unit (DU) of the first node; or an uplink receiving timing of the DU of the first node that is aligned with a downlink receiving timing of the MT of the first node.

7. An apparatus, comprising:

a transceiver;

a processor; and a non-transitory computer-readable storage medium storing a program to be executed by the processor, the program comprising instructions to:

receive configuration information from a second node, wherein the configuration information comprises an association relationship between a time unit index and a timing type; and determine, based on the association relationship, a first timing type associated with a first time unit, and determine, based on the first timing type, a transmission timing for performing uplink transmission in the first time unit, wherein the time unit index is an index determined at a reference subcarrier spacing; and the program including instructions to:

determine the first timing type associated with the first time unit based on the reference subcarrier spacing, a subcarrier spacing corresponding to the first time unit, and the association relationship.

8. The apparatus according to claim 7, wherein the first timing type comprises any one of timing type 1, timing type 2 and timing type 3.

9. The apparatus according to claim 8, wherein the first timing type is represented with two bits, and wherein the two bits corresponding to the timing type 1 are 00, the two bits corresponding to the timing type 2 are 01, the two bits corresponding to the timing type 3 are 10.

10. The apparatus according to claim 7, wherein the association relationship between the time unit index and the timing type indicates a relationship between some time units in a system frame and the timing type, and wherein an unindicated time unit in the system frame corresponds to a default timing type.

11. The apparatus according to claim 7, wherein the program including instructions to:

determine, based on the subcarrier spacing corresponding to the first time unit, a first time unit index that corresponds to the first time unit and that is at the reference subcarrier spacing; and determine, based on the association relationship, the first timing type associated with the first time unit index.

12. The apparatus according to claim 7, wherein the first timing type comprises any one of the following:

an uplink transmission timing that is determined based on timing advance (TA) indication information from the second node;

an uplink sending timing of a mobile termination (MT) of the first node that is aligned with a downlink sending timing of a distributed unit (DU) of the first node; or an uplink receiving timing of the DU of the first node that is aligned with a downlink receiving timing of the MT of the first node.

13. A non-transitory computer readable storage medium, storing computer instructions that, when executed by an apparatus, cause the apparatus to perform:

receiving configuration information, wherein the configuration information comprises an association relationship between a time unit index and a timing type;

determining based on the association relationship, a first timing type associated with a first time unit; and determining based on the first timing type, a transmission timing for performing uplink transmission in the first time unit, wherein the time unit index is an index determined at a reference subcarrier spacing, and the determining, by the first node based on the association relationship, a first timing type associated with a first time unit comprises:

determining, by the first node, the first timing type associated with the first time unit based on the reference subcarrier spacing, a subcarrier spacing corresponding to the first time unit, and the association relationship.

14. The non-transitory computer storage medium according to claim 13, wherein the first timing type comprises any one of timing type 1, timing type 2 and timing type 3.

15. The non-transitory computer storage medium according to claim 14, wherein the first timing type is represented with two bits, and wherein the two bits corresponding to the timing type 1 are 00, the two bits corresponding to the timing type 2 are 01, the two bits corresponding to the timing type 3 are 10.

16. The non-transitory computer storage medium according to claim 13, wherein the association relationship between the time unit index and the timing type indicates a relationship between some time units in a system frame and the timing type, and wherein an unindicated time unit in the system frame corresponds to a default timing type.

17. The non-transitory computer storage medium according to claim 13, wherein the first timing type comprises any one of the following:

an uplink transmission timing that is determined based on timing advance (TA) indication information from the second node;

an uplink sending timing of a mobile termination (MT) of the first node that is aligned with a downlink sending timing of a distributed unit (DU) of the first node; or an uplink receiving timing of the DU of the first node that is aligned with a downlink receiving timing of the MT of the first node.

* * * * *